United States Patent
Wix et al.

(10) Patent No.: US 12,099,854 B2
(45) Date of Patent: *Sep. 24, 2024

(54) TECHNIQUES FOR DETECTING COMPLETION OF PRELOADING OF USER APPLICATIONS

(71) Applicant: TENSERA NETWORKS LTD., Hod Hasharon (IL)

(72) Inventors: Amit Wix, Raanana (IL); Roee Peled, Ramat Gan (IL)

(73) Assignee: TENSERA NETWORKS LTD., Tel Aviv (IL)

( * ) Notice: Subject to any disclaimer, the term of this patent is extended or adjusted under 35 U.S.C. 154(b) by 151 days.

This patent is subject to a terminal disclaimer.

(21) Appl. No.: 17/849,646

(22) Filed: Jun. 26, 2022

(65) Prior Publication Data

US 2022/0334850 A1 Oct. 20, 2022

Related U.S. Application Data

(63) Continuation of application No. PCT/IB2021/061606, filed on Dec. 13, 2021.
(Continued)

(51) Int. Cl.
  G06F 9/445  (2018.01)
  G06F 3/0481 (2022.01)
  (Continued)

(52) U.S. Cl.
  CPC ........ *G06F 9/44521* (2013.01); *G06F 3/0481* (2013.01); *G06F 3/0484* (2013.01);
  (Continued)

(58) Field of Classification Search
  CPC ............. G06F 9/44578; G06F 9/44584; G06F 3/0484; G06F 3/04847; G06F 3/0487
  See application file for complete search history.

(56) References Cited

U.S. PATENT DOCUMENTS

6,038,596 A  3/2000 Baldwin et al.
6,807,570 B1 10/2004 Allen et al.
(Continued)

FOREIGN PATENT DOCUMENTS

CN  102063302 A  5/2011
CN  108681475 A  10/2018
(Continued)

OTHER PUBLICATIONS

"Understand the Activity Lifecycle," Android Developers, pp. 1-21, last updated Oct. 27, 2021, as downloaded from https://developer.android.com/guide/components/activities/activity-lifecycle.
(Continued)

*Primary Examiner* — Raymond N Phan
(74) *Attorney, Agent, or Firm* — MEITAR PATENTS LTD.

(57) ABSTRACT

A user device (24) includes an audio output device (58) and one or more processors (44). The one or more processors are configured to run an Operating System (OS-48), including running an OS component for coordinating outputting of audio generated by user applications (26) to the audio output device, to preload a user application, and, while the user application is in a preload state, to inhibit the audio generated by the preloaded user application using the OS component.

18 Claims, 7 Drawing Sheets

Related U.S. Application Data

(60) Provisional application No. 63/128,143, filed on Dec. 20, 2020.

(51) Int. Cl.
*G06F 3/0484* (2022.01)
*G06F 3/16* (2006.01)
*G06F 9/451* (2018.01)

(52) U.S. Cl.
CPC .............. *G06F 3/165* (2013.01); *G06F 9/445* (2013.01); *G06F 9/44578* (2013.01); *G06F 9/451* (2018.02)

(56) References Cited

U.S. PATENT DOCUMENTS

| | | | |
|---|---|---|---|
| 7,703,133 | B1 | 4/2010 | Balasubramanian et al. |
| 8,140,997 | B2 | 3/2012 | Nemoto |
| 8,250,228 | B1 | 8/2012 | Johansson |
| 8,341,245 | B1 | 12/2012 | Roskind et al. |
| 8,418,190 | B2 | 4/2013 | Rivard et al. |
| 8,881,033 | B2 | 11/2014 | Mentchoukov et al. |
| 9,385,914 | B1 | 7/2016 | Britto et al. |
| 9,513,888 | B1 | 12/2016 | Fultz et al. |
| 9,565,233 | B1 | 2/2017 | Ozuysal et al. |
| 9,959,506 | B1 | 5/2018 | Karppanen |
| 9,961,159 | B2 | 5/2018 | Yellin et al. |
| 9,979,796 | B1 | 5/2018 | Yellin et al. |
| 10,013,497 | B1 | 7/2018 | Boodman |
| 10,432,748 | B2 | 10/2019 | Yellin et al. |
| 10,459,887 | B1 | 10/2019 | Dvortsov et al. |
| 10,613,735 | B1 | 4/2020 | Karpe et al. |
| 11,095,743 | B2 | 8/2021 | Yellin et al. |
| 11,128,729 | B2 | 9/2021 | Yellin et al. |
| 11,715,084 | B1 | 8/2023 | Dixon et al. |
| 2003/0101234 | A1 | 5/2003 | McBrearty et al. |
| 2003/0195940 | A1 | 10/2003 | Basu et al. |
| 2003/0220984 | A1 | 11/2003 | Jones et al. |
| 2004/0030882 | A1 | 2/2004 | Forman |
| 2005/0066283 | A1 | 3/2005 | Kanamaru |
| 2005/0132302 | A1 | 6/2005 | Cina |
| 2006/0026636 | A1 | 2/2006 | Stark et al. |
| 2006/0101514 | A1 | 5/2006 | Milener et al. |
| 2006/0111920 | A1 | 5/2006 | Jacobs et al. |
| 2008/0307339 | A1 | 12/2008 | Boro et al. |
| 2009/0006671 | A1 | 1/2009 | Batson et al. |
| 2009/0037393 | A1 | 2/2009 | Fredricksen et al. |
| 2010/0058248 | A1 | 3/2010 | Park |
| 2011/0211813 | A1 | 9/2011 | Marks |
| 2011/0249668 | A1 | 10/2011 | Van Milligan et al. |
| 2012/0023226 | A1 | 1/2012 | Petersen et al. |
| 2012/0023506 | A1 | 1/2012 | Maeckel et al. |
| 2012/0084343 | A1 | 4/2012 | Mir et al. |
| 2012/0137296 | A1 | 5/2012 | Chen et al. |
| 2012/0159393 | A1 | 6/2012 | Sethi |
| 2012/0167122 | A1 | 6/2012 | Koskimies |
| 2012/0278432 | A1 | 11/2012 | Luna |
| 2012/0317188 | A1 | 12/2012 | Fredricksen et al. |
| 2012/0324481 | A1 | 12/2012 | Xia et al. |
| 2013/0019159 | A1 | 1/2013 | Civelli et al. |
| 2013/0031204 | A1 | 1/2013 | Graham et al. |
| 2013/0106914 | A1* | 5/2013 | Jain .......................... G09G 5/34 345/666 |
| 2013/0120294 | A1 | 5/2013 | Sun et al. |
| 2013/0173513 | A1 | 7/2013 | Chu et al. |
| 2013/0185633 | A1 | 7/2013 | Bunker et al. |
| 2013/0238751 | A1 | 9/2013 | Raleigh et al. |
| 2013/0263023 | A1 | 10/2013 | Goodwin et al. |
| 2013/0275899 | A1 | 10/2013 | Schubert et al. |
| 2013/0283283 | A1 | 10/2013 | Wang et al. |
| 2014/0047003 | A1* | 2/2014 | Golden ................. G06F 16/903 709/203 |
| 2014/0053057 | A1 | 2/2014 | Reshadi et al. |
| 2014/0094163 | A1 | 4/2014 | Widdowson et al. |
| 2014/0162793 | A1 | 6/2014 | Quan et al. |
| 2014/0188932 | A1 | 7/2014 | Kalita et al. |
| 2014/0201673 | A1 | 7/2014 | Dunn |
| 2014/0280485 | A1 | 9/2014 | A Hummaida et al. |
| 2014/0359442 | A1 | 12/2014 | Lin |
| 2014/0372356 | A1 | 12/2014 | Bilal et al. |
| 2014/0373032 | A1 | 12/2014 | Merry et al. |
| 2015/0026415 | A1 | 1/2015 | Clausen et al. |
| 2015/0045921 | A1 | 2/2015 | Stewart et al. |
| 2015/0046519 | A1 | 2/2015 | Shukla et al. |
| 2015/0127819 | A1 | 5/2015 | Cimino et al. |
| 2015/0193395 | A1 | 7/2015 | Nicolaou et al. |
| 2015/0207852 | A1 | 7/2015 | Boodman et al. |
| 2015/0208205 | A1 | 7/2015 | Chan et al. |
| 2015/0215816 | A1 | 7/2015 | Abou-Elkheir et al. |
| 2015/0281147 | A1 | 10/2015 | Wang et al. |
| 2015/0347615 | A1 | 12/2015 | McGushion et al. |
| 2015/0371142 | A1 | 12/2015 | Jain |
| 2015/0372933 | A1 | 12/2015 | Cai et al. |
| 2016/0012104 | A1 | 1/2016 | Petrov |
| 2016/0057167 | A1 | 2/2016 | Bach |
| 2016/0085583 | A1 | 3/2016 | Goodson |
| 2016/0103608 | A1 | 4/2016 | Nukala et al. |
| 2016/0227464 | A1 | 8/2016 | Senarath et al. |
| 2016/0259623 | A1 | 9/2016 | Sumner et al. |
| 2016/0259656 | A1 | 9/2016 | Sumner et al. |
| 2016/0344679 | A1 | 11/2016 | Lane et al. |
| 2017/0011681 | A1 | 1/2017 | Bathiche et al. |
| 2017/0031869 | A1 | 2/2017 | Franczyk et al. |
| 2017/0032568 | A1 | 2/2017 | Gharpure et al. |
| 2017/0046235 | A1 | 2/2017 | Straub et al. |
| 2017/0126833 | A1 | 5/2017 | DeLuca et al. |
| 2017/0278477 | A1 | 9/2017 | Jeong et al. |
| 2017/0293465 | A1 | 10/2017 | Kotteri et al. |
| 2017/0371685 | A1 | 12/2017 | Tanaka et al. |
| 2018/0129537 | A1 | 5/2018 | Kurtzman et al. |
| 2018/0212741 | A1 | 7/2018 | Lindoff et al. |
| 2018/0241837 | A1 | 8/2018 | Yellin et al. |
| 2018/0246862 | A1 | 8/2018 | Burkard et al. |
| 2018/0293087 | A1 | 10/2018 | Lee et al. |
| 2018/0364890 | A1 | 12/2018 | Lee et al. |
| 2019/0065144 | A1 | 2/2019 | Sumner et al. |
| 2019/0087205 | A1 | 3/2019 | Guday |
| 2019/0100152 | A1 | 4/2019 | Shastry |
| 2019/0188005 | A1 | 6/2019 | Chen et al. |
| 2019/0188012 | A1 | 6/2019 | Chen et al. |
| 2019/0188013 | A1 | 6/2019 | Krishna et al. |
| 2019/0196849 | A1 | 6/2019 | Chen et al. |
| 2019/0205159 | A1 | 7/2019 | Wen et al. |
| 2019/0221224 | A1 | 7/2019 | Heitkamp et al. |
| 2019/0347128 | A1 | 11/2019 | Han et al. |
| 2019/0361581 | A1 | 11/2019 | Wang et al. |
| 2019/0370022 | A1 | 12/2019 | Han et al. |
| 2019/0370095 | A1 | 12/2019 | Chen et al. |
| 2020/0159597 | A1 | 5/2020 | Yellin et al. |
| 2020/0159816 | A1 | 5/2020 | Bostrom et al. |
| 2020/0183822 | A1 | 6/2020 | Bates |
| 2020/0225818 | A1 | 7/2020 | Ozuysal |
| 2020/0257491 | A1* | 8/2020 | Yellin .................. H04L 69/329 |
| 2020/0336514 | A1 | 10/2020 | Momchilov et al. |
| 2020/0342338 | A1 | 10/2020 | Huang |
| 2020/0401418 | A1 | 12/2020 | Regev et al. |
| 2021/0103447 | A1 | 4/2021 | Wei et al. |
| 2021/0149689 | A1 | 5/2021 | Jung et al. |
| 2021/0224085 | A1 | 7/2021 | Moore |
| 2021/0304096 | A1 | 9/2021 | Kirubakaran et al. |
| 2021/0323908 | A1 | 10/2021 | Yellin et al. |
| 2021/0329088 | A1 | 10/2021 | Yellin et al. |
| 2021/0329089 | A1 | 10/2021 | Yellin et al. |
| 2021/0329090 | A1 | 10/2021 | Yellin et al. |
| 2021/0329091 | A1 | 10/2021 | Yellin et al. |
| 2021/0385295 | A1 | 12/2021 | Yellin et al. |
| 2022/0121725 | A1 | 4/2022 | Peled et al. |
| 2022/0124171 | A1 | 4/2022 | Peled et al. |
| 2022/0179667 | A1 | 6/2022 | Peled et al. |
| 2022/0179668 | A1 | 6/2022 | Peled et al. |
| 2022/0210264 | A1 | 6/2022 | Jung et al. |
| 2022/0221998 | A1 | 7/2022 | Xu |
| 2022/0261258 | A1 | 8/2022 | Peled et al. |

(56) References Cited

U.S. PATENT DOCUMENTS

| 2022/0413695 A1 | 12/2022 | Guan et al. |
| 2023/0018798 A1 | 1/2023 | Coffman et al. |
| 2023/0135295 A1 | 5/2023 | Cha et al. |

FOREIGN PATENT DOCUMENTS

| CN | 108920156 A | 11/2018 |
| CN | 108958828 A | 12/2018 |
| KR | 20160116910 A | 10/2016 |
| WO | 2015169188 A1 | 11/2015 |
| WO | 2018055506 A1 | 3/2018 |
| WO | 2018234967 A1 | 12/2018 |
| WO | 2021019415 A1 | 2/2021 |
| WO | 2019082042 A1 | 5/2021 |
| WO | 2021161174 A1 | 8/2021 |
| WO | 2022118131 A1 | 6/2022 |
| WO | 2022130156 A1 | 6/2022 |
| WO | 2022162515 A1 | 8/2022 |

OTHER PUBLICATIONS

International Application # PCT/IB2021/061606 Search Report dated Apr. 7, 2022.
Wix et al., U.S. Appl. No. 17/849,644, filed Jun. 26, 2022.
U.S. Appl. No. 16/968,652 Office Action dated Jul. 10, 2023.
U.S. Appl. No. 17/849,644 Office Action dated Oct. 5, 2023.
U.S. Appl. No. 17/363,047 Office Action dated Nov. 1, 2022.
CN Application # 2021800134875 Office Action dated Dec. 12, 2023.
U.S. Appl. No. 17/582,025 Office Action dated Nov. 6, 2023.
U.S. Appl. No. 17/797,130 Office Action dated Dec. 26, 2023.
Lee et al., "CAS: Context-Aware Background Application Scheduling in Interactive Mobile Systems," IEEE Journal on Seleted Areas in Communications, vol. 35, No. 5, pp. 1013-1029, May 2017.
U.S. Appl. No. 17/567,183 Office Action dated Dec. 30, 2022.
U.S. Appl. No. 17/739,122 Office Action dated Feb. 1, 2023.
EP Application # 20845959.4 Search Report dated Feb. 2, 2023.
U.S. Appl. No. 17/624,357 Office Action dated Mar. 13, 2023.
U.S. Appl. No. 17/567,187 Office Action dated Mar. 27, 2023.
EP Application # 21754503.7 Search Report dated Jan. 29, 2024.
U.S. Appl. No. 17/681,883 Office Action dated Feb. 8, 2024.
U.S. Appl. No. 17/797,130 Office Action dated Apr. 9, 2024.

\* cited by examiner

TECHNIQUES FOR DETECTING COMPLETION OF PRELOADING OF USER APPLICATIONS

CROSS-REFERENCE TO RELATED APPLICATIONS

This application is a continuation of PCT Application PCT/IB2021/061606, filed Dec. 13, 2021, which claims the benefit of U.S. Provisional Patent Application 63/128,143, filed Dec. 20, 2020. The disclosures of these related applications are incorporated herein by reference.

FIELD OF THE INVENTION

The present invention relates generally to handling of user applications in user devices, and particularly to methods and systems for preloading of applications and content.

BACKGROUND OF THE INVENTION

In applications ("apps") that run on user devices such as smartphones, one of the major factors affecting user experience is the latency of the User Interface (UI). Various techniques have been proposed for reducing latency and providing a more responsive UI. Some techniques involve prefetching of content. Other techniques involve background preloading of apps. Yet other techniques involve pre-rendering of an app's UI. Techniques of this sort are described, for example, in PCT International Publication WO 2018/055506, entitled "An Optimized CDN for the Wireless Last Mile," which is incorporated herein by reference.

PCT International Publication WO 2019/171237, entitled "Application Preloading in the Presence of User Actions," whose disclosure is incorporated herein by reference, describes a method in a processor of a user device. The method includes preloading one or more user applications in a background mode. An activity, which is invoked in the processor and is associated with a given preloaded user application, is detected. An assessment is made by the processor, whether the activity is a preload-initiated activity that is invoked due to preloading of the given user application, or whether the activity is a user-initiated activity that is invoked due to an action by the user. If the activity is assessed to be a preload-initiated activity, the activity is handled using a first handling scheme. If the activity is assessed to be a user-initiated activity, the activity is handled using a second handling scheme, different from the first handling scheme.

SUMMARY OF THE INVENTION

An embodiment of the present invention that is described herein provides a user device including an audio output device and one or more processors. The one or more processors are configured to run an Operating System (OS), including running an OS component for coordinating outputting of audio generated by user applications to the audio output device, to preload a user application, and, while the user application is in a preload state, to inhibit the audio generated by the preloaded user application using the OS component.

In some embodiments, the OS component, used by the one or more processors for inhibiting the audio of the preloaded user application, is an OS component that mutes the audio of the user applications in response to reception of an incoming call in the user device. In other embodiments, the OS component, used by the one or more processors for inhibiting the audio of the preloaded user application, is an OS component that grants audio focus to a requesting user application.

In an example embodiment, the preloaded user application is configured to be aware of the preload state, and to inhibit the audio by refraining from requesting the audio focus while in the preload state. In another embodiment, the OS is configured to inhibit the audio by refraining from granting the audio focus to the preloaded user application while the preloaded user application is in the preload state. In a disclosed embodiment, while the preloaded user application is in the preload state, the OS is configured to respond to an audio focus request from the preloaded user application by granting a dummy audio focus, the dummy audio focus being interpreted as a genuine audio focus by the preloaded user application but does not affect the audio focus of other user applications.

In yet another embodiment, in response to a request from a user to interact with the preloaded user application, the OS is configured to issue an audio focus request on behalf of the user application. In still another embodiment, the OS is configured to inhibit the audio of the preloaded user application only if the preloaded user application was not granted the audio focus prior to being preloaded, or only if a request from the preloaded user application is not present in an audio focus request stack maintained by the OS component.

In a further embodiment, the OS is configured to inhibit the audio by refraining from preloading a user application that currently has audio focus, or a user application having a request present in an audio focus request stack maintained by the OS component. In some embodiments, the one or more processors are configured to inhibit the audio by muting the preloaded user application.

There is additionally provided, in accordance with an embodiment that is described herein, a user device including an output device and one or more processors. The one or more processors are configured to run an Operating System (OS), to preload one or more User Interface (UI) displays of a user application in a simulated-foreground mode in which the UI displays are (i) processed in a foreground mode by the user application, but (ii) kept in a background mode by the OS and hidden from a user of the user device. In response to detecting that the user application begins, or is about to begin, outputting media to the output device, the one or more processors are configured to decide that preloading of the one or more UI displays is completed.

In some embodiments, in response to deciding that preloading of the one or more UI displays is completed, the one or more processors are configured to transition the user application to a preloaded-background state in which both the OS and the user application consider the UI displays to be in the background. In an embodiment, by transitioning the user application to the preloaded-background state, the one or more processors are configured to ensure that the media begins to play only after the user requests interaction with the user application.

In some embodiments, the media includes audio. In an embodiment, the one or more processors are configured to detect that the user application is about to begin outputting audio, by detecting that the user application has requested audio focus from the OS. In a disclosed embodiment, the media includes video.

There is also provided, in accordance with an embodiment that is described herein, a user device including a Limited Hardware Resource (LHR) and one or more processors. The LHR is shared among user applications running in the user device. The one or more processors are configured to preload a user application, and, while the user application is in a preload state, to prevent the preloaded user application from accessing the LHR.

In some embodiments, the LHR includes a camera of the user device. In an embodiment, the preloaded user application is configured to be aware of the preload state, and to refrain from accessing the LHR while in the preload state. In another embodiment, the one or more processors are configured to detect that the preloaded user application begins accessing the LHR, and in response to decide that preloading of the user application is completed.

There is further provided, in accordance with an embodiment that is described herein, a user device including a display screen and one or more processors. The one or more processors are configured to run an Operating System (OS), to preload one or more User Interface (UI) displays of a user application in a simulated-foreground mode in which the UI displays are (i) processed in a foreground mode by the user application, but (ii) kept in a background mode by the OS and hidden from a user of the user device, and, in response to detecting that the user interacts with an out-of-app UI element generated by the user application, to decide that preloading of the one or more UI displays is completed.

In some embodiments, in response to deciding that the user interacts with the out-of-app UI element, the one or more processors are configured to transition the user application to a preloaded-background state in which both the OS and the user application consider the UI displays to be in the background.

There is also provided, in accordance with an embodiment that is described herein, a method including, in a user device having an audio output device, running an Operating System (OS), including running an OS component for coordinating outputting of audio generated by user applications to the audio output device. A user application is preloaded in the user device. While the user application is in a preload state, the audio generated by the preloaded user application is inhibited using the OS component.

There is additionally provided, in accordance with an embodiment that is described herein, a method including, in a user device having an output device, preloading one or more User Interface (UI) displays of a user application in a simulated-foreground mode in which the UI displays are (i) processed in a foreground mode by the user application, but (ii) kept in a background mode by an Operating System (OS) of the user device and hidden from a user of the user device. In response to detecting that the user application begins, or is about to begin, outputting media to the output device, a decision is made that preloading of the one or more UI displays is completed.

There is additionally provided, in accordance with an embodiment that is described herein, a method including preloading a user application in a user device having a Limited Hardware Resource (LHR) that is shared among user applications running in the user device. While the user application is in a preload state, the preloaded user application is prevented from accessing the LHR.

There is also provided, in accordance with an embodiment that is described herein, a method including, in a user device having a display screen, preloading one or more User Interface (UI) displays of a user application in a simulated-foreground mode in which the UI displays are (i) processed in a foreground mode by the user application, but (ii) kept in a background mode by an Operating System (OS) of the user device and hidden from a user of the user device. In response to detecting that the user interacts with an out-of-app UI element generated by the user application, a decision is made that preloading of the one or more UI displays is completed.

The present invention will be more fully understood from the following detailed description of the embodiments thereof, taken together with the drawings in which:

DETAILED DESCRIPTION OF EMBODIMENTS

Definitions

Figure 1:
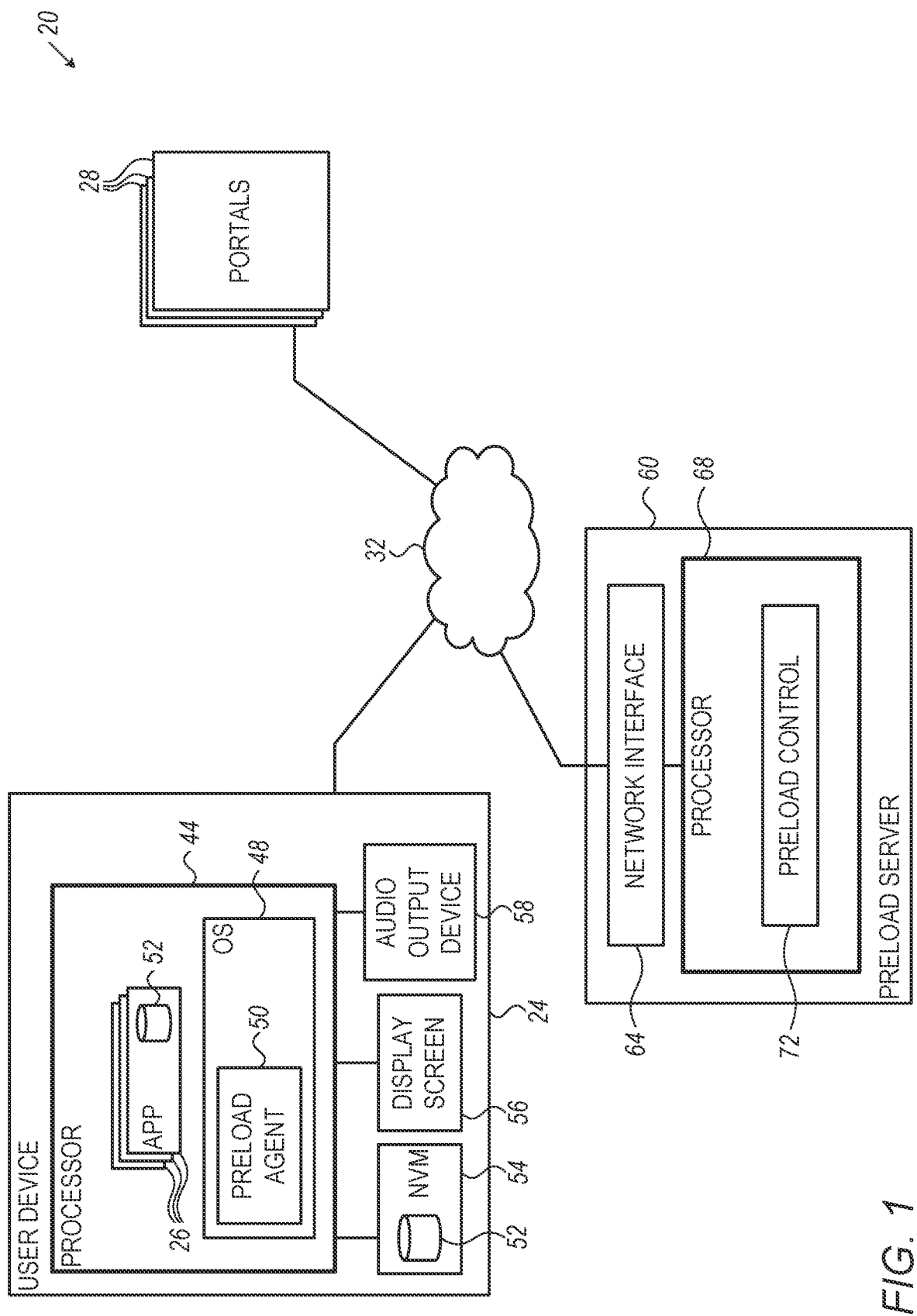
FIG. 1 is a block diagram that schematically illustrates a communication system that employs preloading, in accordance with an embodiment of the present invention.

The present disclosure refers to preloading of applications ("apps") and app components such as User Interlace (UI) Displays. In the present context, the term "preloading" refers to the process of loading, launching and at least partially running an app in a background mode unnoticeably to the user, not in response to a request from the user to interact with the app. App components that may be preloaded comprise, for example, the main feed of the app, other UI displays of the app, and/or in-app content, i.e., app content that is not immediately visible to the user upon launching the app. App preloading may involve, for example, pre-rendering of one or more UI displays of the app in the background.

The term "pre-rendering" refers to the process of constructing a UI display of an app in the background mode. Pre-rendering is considered herein to be a component of a preloading operation. Pre-rendering may involve UI tasks that modify the UI display, and/or UI tasks that do not directly modify the UI display but are prerequisite to such modification or are synced to modification of the UI display in the background. Thus, for example, initialization or preparatory tasks that are performed when preloading an app and preparing to initialize or modify a UI display of the app are also regarded herein as pre-rendering tasks.

Certain aspects of preloading and pre-rendering are addressed in PCT International Publication WO 2021/161174, entitled "Preloading of Applications and In-Application Content in User Devices," filed Feb. 10, 2021; in PCT International Publication WO 2021/019415, entitled "Pre-Rendering of Application User-Interfaces in User Devices," filed Jul. 26, 2020; and in PCT International Publication WO 2019/082042, entitled "Audio Inhibition of Applications in Background Mode, Pre-Loading and Refreshing Thereof," filed Oct. 21, 2018, whose disclosures are incorporated herein by reference.

The term "UI display" in this context refers to a logical UI element—A view or a window that is used by the app to enable interaction with the user. In the Android Operating System (OS), for example, UI displays are referred to as "views" or "activities." The description that follows will refer mainly to the Android OS and to activities, by way of example. Activities are commonly maintained in "tasks". A task typically comprises a container that stores, as a stack, records of activities that users interact with when performing a certain job.

Overview

Embodiments of the present invention that are described herein provide improved methods and systems for preloading of user applications ("apps") and their content in user devices. More specifically, the techniques described herein preload apps in a manner that is transparent (i.e., imperceptible, unnoticeable) to the user. Transparency to the user has several aspects, including, for example, preventing preloaded apps from outputting audio and/or video, preventing preloaded apps from degrading the performance and user experience of foreground (non-preloaded) apps, preventing preloaded apps from accessing limited hardware resources of the user device, and the like.

One important aspect of transparency is ensuring that a preloaded app will begin to generate its start-up audio or video only after the user requested to launch the app. Otherwise, i.e., if the app will begin playing audio or video while still in the background (even if this audio or video is made unnoticeable to the user) the audio or video will not start from the beginning when the user launches the app. As will be elaborated below, some of the techniques disclosed herein ensure this particular aspect of transparency to the user.

In some embodiments, a user device runs an Operating System (OS) that, among other functions, preloads UI displays and in-app content of user apps. The disclosed techniques can be used for preloading of individual UI displays, of groups of interrelated. UI displays, or of entire apps. For the sake of clarity, the description that follows refers mainly to the Android OS and to Android Activities, by way of example. The disclosed techniques, however, are applicable to any other suitable OS and any other suitable type of UI display or other content. The OS component that carries out the various preloading functions is referred to herein as a "preload agent."

In some embodiments, the preload agent inhibits the audio of a preloaded app using an existing OS component that is responsible for coordinating outputting of audio generated by the various user apps. For example, the preloading agent may invoke an OS component that mutes app audio in response to arrival of an incoming phone call. As another example, the preloading agent may use an OS component that is responsible for granting "audio focus" to requesting apps.

In the present context, the term "inhibiting audio" refers to any suitable mechanism that prevents the audio of an app from being sounded to the user. Inhibiting may be direct, e.g., by muting the app. Alternatively, Inhibiting may be indirect, e.g., by causing the app to refrain from generating the audio in the first place, or even by refraining from preloading an app at all. Examples of these mechanisms are described herein.

In some embodiments, one or more hardware resources of the user device that are shared by various apps, e.g., a camera, are regarded as Limited Hardware Resources (LHRs). In an embodiment, the preload agent prevents preloaded apps from accessing LHRs. The preload agent re-enables access to the LHRs when the app is moved to the foreground, e.g., in response to user interaction with the app.

In some embodiments, the preloading process begins by setting the app to a "simulated-foreground" or "foreground simulation" state, in which UI displays are processed in a foreground mode by the user application, but kept in a background mode by the OS and hidden from a user of the user device. At some stage, the preload agent decides to transition the app to a "preloaded background" state, in which both the OS and the app treat the UI displays as background UI displays. This process is described in detail in PCT international Publication WO 2021/161174, cited above.

In some embodiments described herein, the preload agent transitions a preloaded app to the "preloaded background" state upon detecting that the app has requested audio focus. This choice of transition point ensures, with high likelihood, that when the user will request starting the app (e.g., click on the app icon), the app start-up audio and/or video will start playing from the beginning.

More generally, the preload agent may detect using various means that a preloaded app, which is currently in the foreground simulation state, begins or is about to begin outputting media (audio or video). The preload agent may use this detection as an indication that the foreground simulation stage is completed, i.e., that the desired UI displays have been loaded in the background. The preload agent may then transition the app to the preloaded background state.

In another embodiment, the preload agent decides that foreground simulation is completed in response to detecting that the user begins interacting with a notification or widget associated with the preloaded app. In yet another embodiment, the preload agent decides that foreground simulation is completed in response to detecting that the app accesses an LHR.

Various other embodiments and implementation examples are described.

System Description

FIG. 1 is a block diagram that schematically illustrates a communication system 20 that employs preloading, in accordance with an embodiment of the present invention.

System 20 comprises a user device 24, which runs one or more user applications ("apps") 26. Device 24 may comprise any suitable wireless or wireline device, such as, for example, a cellular phone or smartphone, a wireless-enabled laptop or tablet computer, a desktop personal computer, a video gaming console, a smart TV, a wearable device, an automotive user device, or any other suitable type of user device that is capable of presenting content to a user. The figure shows a single user device 24 for the sake of clarity. Real-life systems typically comprise a large number of user devices of various kinds.

In the present context, the terms "user application," "application" and "app" are used interchangeably, and refer to any suitable computer program that runs on the user device and may be invoked (activated) by the user. Some apps 26 may be dedicated, special-purpose applications such as game apps. Other apps 26 may be general-purpose applications such as Web browsers.

In some embodiments, although not necessarily, apps 26 are provided by and/or communicate with one or more network-side servers, e.g., portals 28, over a network 32. Network 32 may comprise, for example a Wide Area Network (WAN) such as the Internet, a Local Area Network (LAN), a wireless network such as a cellular network or Wireless LAN (WLAN), or any other suitable network or combination of networks.

In the present example, user device 24 comprises a processor 44 that carries out the various processing tasks of the user device. Among other tasks, processor 44 runs an Operating System (OS) 48, which in turn runs apps 26. The embodiments described herein refer mainly to the Android OS. The disclosed techniques, however, are applicable to any other suitable OS that may run on user devices, e.g., iOS, Windows, Linux and the like. OS 48 comprises a software component referred to as a preload agent 50, which handles preloading of apps. Apps 26, OS 48 and preload agent 50 are drawn schematically inside processor 44, to indicate that they comprise software running on the processor.

In addition, user device 24 comprises a Non-Volatile Memory (NVM) 54, e.g., a Flash memory. NVM 54 may serve, inter alia, for storing a cache memory 52 for caching content associated with apps. In some embodiments the user device uses a single cache 52. In other embodiments, also depicted schematically in the figure, a separate cache memory 52 may be defined per app. Hybrid implementations, in which part of cache 52 is centralized and some is app-specific, are also possible. For clarity, the description that follows will refer simply to "cache 52", meaning any suitable cache configuration.

User device 24 further comprises a display screen 56 for presenting visual content to the user, and an audio output device 58 (e.g., speaker and/or headset output) for sounding audio to the user. Each of screen 56 and audio output device 58 is also referred to generally as an "output device" of user device 24. User device 24 further comprises a suitable network interface (not shown in the figure) for connecting to network 32. This network interface may be wired (e.g., an Ethernet Network Interface Controller—NIC) or wireless (e.g., a cellular modem or a Wi-Fi modem). Typically, user device 24 further comprises some internal memory, e.g., Random Access Memory (RAM)—not shown in the figure—that is used for storing relevant code and/or data.

In the example embodiment of FIG. 1, although not necessarily, system 20 further comprises a preload server 60 that performs preloading-related tasks on the network side. Server 60 comprises a network interface 64 for communicating over network 32, and a processor 68 that carries out the various tasks of the preload server. In the present example, processor 68 runs a preload control unit 72 that carries out network-side preloading-related tasks.

Network-side preloading-related tasks may comprise, for example, deciding which apps to preload and when, choosing whether and which in-app content to preload, deciding how much of an app component to preload (e.g., only executing some initial executable code, or pre-rendering of the app's user interface and/or deciding on the duration of foreground simulation). Another possible network-side preloading-related task may comprise, for example, deciding on an applicable preloading mode, e.g., off-line preloading in which access to the network is restricted or forbidden, or on-line preloading in which network access is permitted. Preloading modes are addressed, for example, in PCT Application PCT/IB2020/057046, whose disclosure is incorporated herein by reference. Yet another example is a "whitelist" of apps permitted to undergo preloading, as elaborated below. In an embodiment, preload server 60 may be implemented as a cloud-based application.

In the embodiments described herein, for the sake of clarity, preloading tasks are described as being carried out by processor 44 of user device 24. Generally, however, preloading tasks may be carried out by processor 44 of device 24, by processor 68 of server 60, or both.

Preloading an app 26 may involve preloading any app element such as executable code associated with the app, e.g., launch code, app feed, app landing page, various UI elements associated with the app, content associated with the app, app data associated with the app, and/or code or content that is reachable using the app by user actions such as clicks ("in-app content"). Pre-rendering of content may involve background processing of any suitable kind of UI display, or a portion thereof. In Android terminology, for example, pre-rendering may comprise background processing of one or more Android Activities. In the background mode, UI elements associated with the app are not presented to the user on display screen 56, i.e., are hidden from the user. When the user invokes a previously-preloaded app, the user device switches to run the app in a foreground mode that is visible to the user. (The terms "background mode" and "foreground mode" are referred to herein simply as "background" and "foreground," for brevity.)

The configurations of system 20 and its various elements shown in FIG. 1 are example configurations, which are chosen purely for the sake of conceptual clarity. In alternative embodiments, any other suitable configurations can be used. For example, in some embodiments the preloading tasks may be implemented entirely in processor 44 of user device 24, in which case subsystem 60 may be eliminated altogether.

Preload agent 50 may be implemented in a software module running on processor 44, in an application running on processor 44, in a Software Development Kit (SDK) embedded in an application running on processor 44, as part of the OS running on processor 44 (possibly added to the OS by the user-device vendor or other party), in a proxy server running on processor 44, using a combination of two or more of the above, or in any other suitable manner. In most of the description that follows, preload agent 50 is assumed to be part of OS 48 of user device 24.

Although the embodiments described herein refer mainly to human users, the term "user" refers to machine users, as well. Machine users may comprise, for example, various host systems that use wireless communication, such as in various Internet-of-Things (IoT) applications.

The different elements of system 20 may be implemented using suitable software, using suitable hardware, e.g., using one or more Application-Specific Integrated Circuits (ASICs) or Field-Programmable Gate Arrays (FPGAs), or using a combination of hardware and software elements. Cache 52 may be implemented using one or more memory or storage devices of any suitable type. In some embodiments, preload agent 50 and/or preloading server 60 may be implemented using one or more general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Preloading of Activities, and Isolation Between Preloaded and Non-Preloaded Activities In some embodiments of the present invention, preload agent 50 in OS 48 of user device 24 preloads one or more UI displays of one or more apps, in order to reduce the latency experienced by the user. The description herein refers mainly to Android Activities as an example of UI display, but the disclosed techniques can be used for preloading any other suitable type of UI displays. The disclosed techniques are applicable, with certain variations, to preloading of individual Activities, apps and in-app content.

OS 48 typically maintains one or more "Tasks" of Activities. The term "Task" refers to a container used to store Activities that users interact with when performing a certain job. Activities stored in a certain Task may belong to a single app or to multiple different apps (e.g., when one app opens an Activity of another app).

In some embodiments OS 48 associates each Task with a "Task stack". The term "Task stack" refers to a container which holds different Tasks in a certain logical ordering, such as stack ordering (last-in, first-out). The ordering relates to the ordering of Activities being displayed, e.g., which Activity is displayed on top of which. OS 48 may also apply logical ordering among different Task stacks. In the Android OS, "Task stack" is sometimes referred to as "Activity stack".

When applying preloading, OS 48 takes various measures to keep the preloading operations unnoticeable by the user. Thus, for example, the OS ensures that preloaded Activities are invisible to the user, and that preloading operations do not affect the "recents" screen of the OS (also referred to as "overview screen," "recent task list," "recent apps," "recents view" or "recently used apps").

In some embodiments, OS 48 keeps the preloading operations unnoticeable by the user by isolating preloaded Activities and non-preloaded Activities in separate data structures, e.g., separate Tasks and Task stacks. When a preloaded Activity needs to be displayed to the user, the OS moves the activity from the data structures dedicated to preloaded Activities to the data structures dedicated to non-preloaded Activities.

Figure 2:
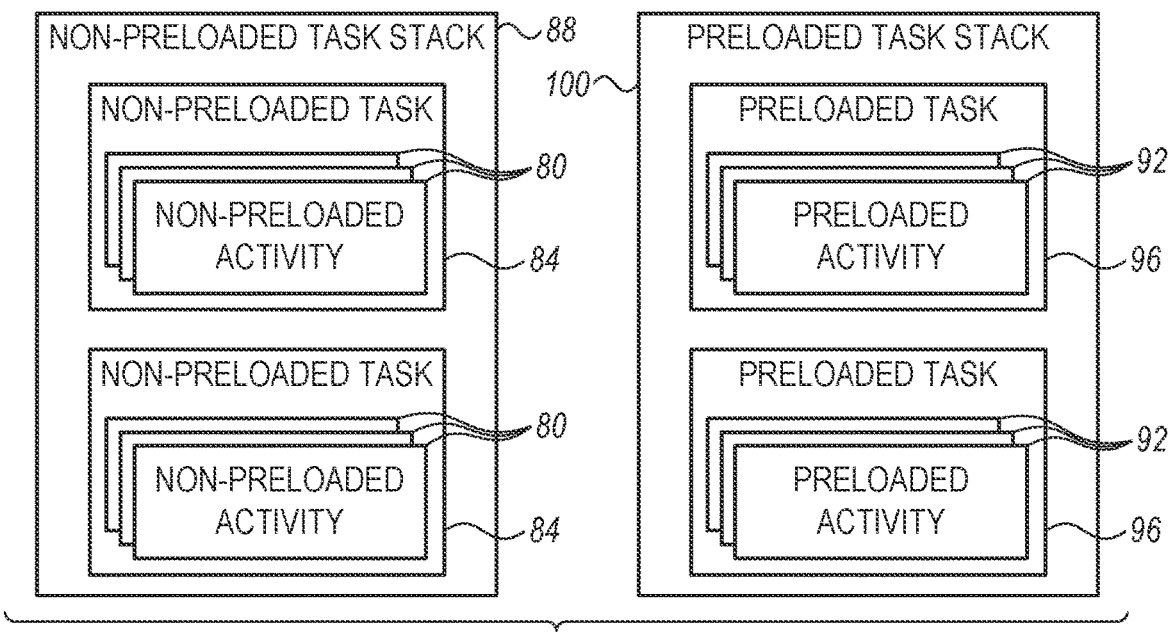
FIGS. 2 and 3 are diagrams that schematically illustrate data structures used for handling preloaded and non-preloaded Activities, in accordance with embodiments of the present invention.

FIG. 2 is a diagram that schematically illustrates data structures used by OS 48 for handling preloaded and non-preloaded Activities, in accordance with an embodiment of the present invention.

As seen, OS 48 is configured to handle multiple non-preloaded Activities 80. The non-preloaded Activities are associated with one or more "non-preloaded Tasks" 84. Each non-preloaded Task 84 is a stack that stores some of the non-preloaded Activities in a certain logical ordering. Non-preloaded Tasks 84 are associated with one or more non-preloaded Task stacks 88 (only one Task stack is seen in the figure, for clarity). Each Non-preloaded Task 84 is associated with one of the non-preloaded Task stacks 88.

OS 48 maintains a similar, but independent, hierarchy for preloaded Activities 92. Preloaded Activities 92 are associated with one or more "preloaded Tasks" 96. Each preloaded Task 96 is a stack that stores some of the preloaded Activities in a certain logical ordering. Preloaded Tasks 96 are in turn associated with one or more preloaded Task stacks 100 (again—only one preloaded Task stack is seen in the figure, for clarity). Each preloaded Task 96 is associated with one of the preloaded Task stacks 100.

Thus, in some embodiments, OS 48 stores the non-preloaded Activities in a hierarchy of data structures (non-preloaded Activities, non-preloaded Tasks and non-preloaded Task stacks). OS 48 stores the preloaded Activities in another, separate hierarchy of data structures (preloaded Activities, preloaded Tasks and preloaded Task stacks).

The isolation, or separation, between the handling of preloaded and non-preloaded Activities is typically characterized in that:

A non-preloaded Task holds only non-preloaded Activities, not preloaded Activities. A non-preloaded Task stack holds only non-preloaded Tasks, not preloaded Tasks. Similarly, a preloaded Task holds only preloaded Activities, not non-preloaded Activities; and a preloaded Task stack holds only preloaded Tasks, not non-preloaded Tasks.

Non-preloaded Activities, Tasks and Task stacks are not influenced by preloaded Activities, Tasks and Task stacks. For example, there is no stacking or other ordering between preloaded Tasks and non-preloaded Tasks; and there is no stacking or other ordering between preloaded Task stacks and non-preloaded Task stacks.

Preloading of Activities and/or creation of preloaded Tasks and Task stacks do not influence the "recents" screen of OS 48. Therefore, if a certain Task was on the recents screen, the Task will remain on the recents screen notwithstanding any operation applied to a preloaded Activity, preloaded Task or preloaded Task stack. By the same token, if a Task was not on the recents screen, it will not be added to the recents screen as a result of some preloading-related operation. Moreover, the order of appearance of Tasks in the recents view is not affected by preloading operations.

The data structures described above, and their handling by OS 48, simplify the implementation of preloading operations, and ensure that preloading operations are unnoticeable to the user.

Figure 3:
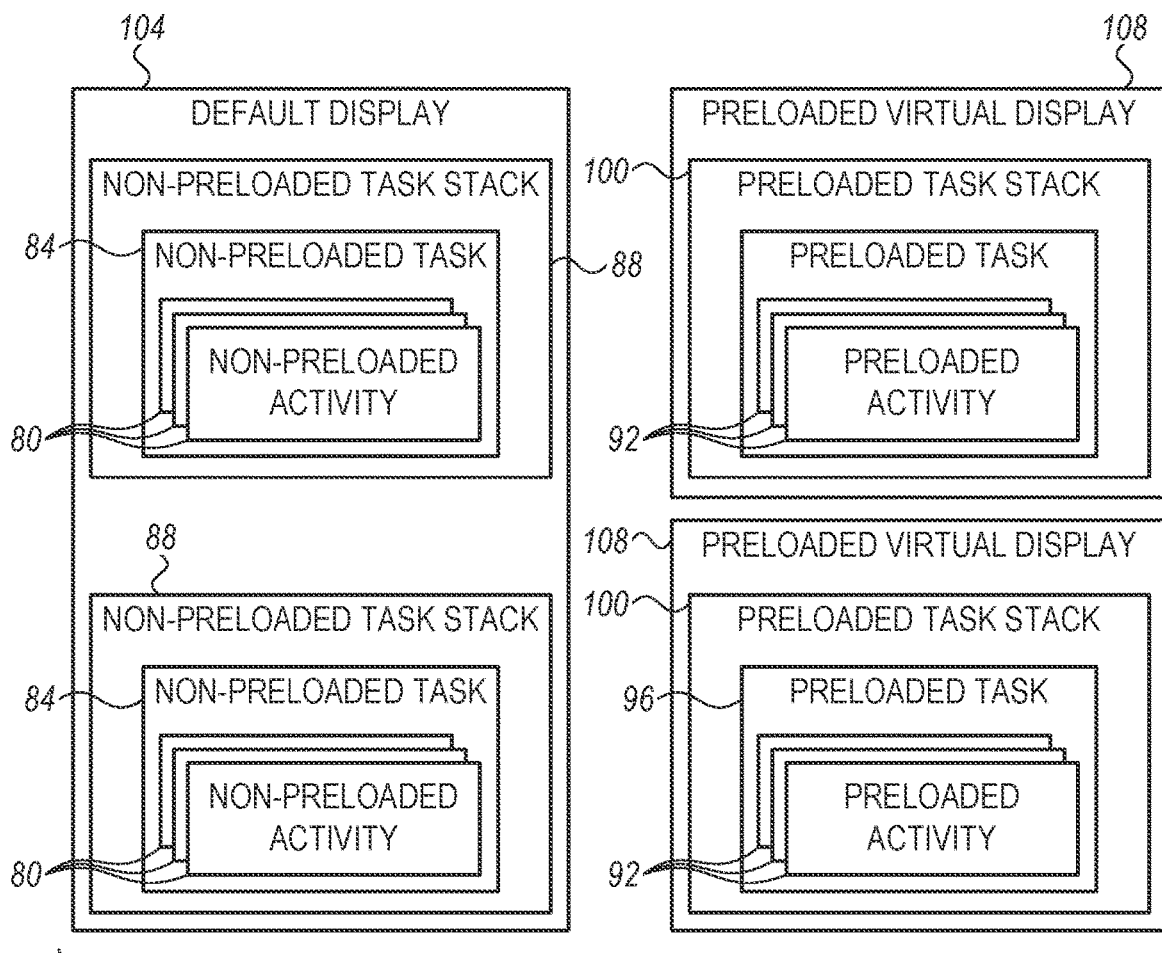

FIG. 3 is a diagram that schematically illustrates data structures used for handling preloaded and non-preloaded Activities, in accordance with another embodiment of the present invention. In this embodiment, OS 48 supports an additional level of hierarchy on top of the hierarchy of FIG. 2—That of a "Display".

In the present context, the term "display" refers to a logical construct, e.g., a container, for storing Activities. Each display has properties and a state. The properties are fixed attributes characterizing the display, such as height, width, density, color modes, supported refresh rates, as well as special capabilities such as High Dynamic Range (HDR). The state comprises variable attributes of the display, e.g., the display orientation (portrait or landscape). A display may be defined as a virtual display, i.e., a display that is not associated with physical hardware and its content is therefore not displayed to the user. Instead, a virtual display allows rendering content to a virtual surface, where a surface is an object holding pixels.

In some embodiments, OS 48 defines a default Display 104 (whose content is actually displayed to the user on display screen 56) and one or more virtual Displays 108 dedicated for preloading (and referred to as "preloaded virtual displays"). All non-preloaded Task stacks 88 are associated with default Display 104. Each preloaded Task stack 100 is associated with one of preloaded virtual Displays 108. In an example implementation there is one-to-one correspondence between preloaded Task stacks 100 and preloaded virtual Displays 108, i.e., each preloaded Task stack 100 is associated with a single respective preloaded virtual Display 108.

The additional hierarchy retains the above-described separation between preloaded and non-preloaded Activities. For example, default Display 104 comprises only non-preloaded Task stacks and no preloaded Task stacks; and a preloaded virtual Display comprises only preloaded Task stacks and no non-preloaded Task stacks.

The configuration of displays depicted in FIG. 3 is chosen purely by way of example. In alternative embodiments, any other suitable configuration can be used. For example, there need not necessarily be strict one-to-one correspondence between preloaded Task stacks 100 and preloaded virtual Displays 108, i.e., a certain virtual display 108 may comprise two or more preloaded Task stacks 100. As another example, the OS may maintain multiple regular (non-virtual) displays at the same time. Additional aspects of preloading using virtual Displays are addressed further below in the "Additional embodiments and variations" section.

Preloading of Activities Using Foreground Simulation

In some embodiments, preload agent 50 preloads one or more Activities of one or more user apps 26 using a special operational mode that is referred to as "foreground simulation" or "simulated foreground". In this mode, app 26 processes the Activity in a foreground mode, but OS 48 keeps the Activity in a background mode that is hidden from the user. In other words, an Activity undergoing foreground simulation is in the foreground from the perspective of the app, and in the background from the perspective of the OS.

The foreground simulation mode enables the Activity to be preloaded, including pre-rendering and other suitable preloading-related operations, optionally using the existing app program code, while nevertheless keeping the Activity in the background, unnoticeable to the user.

In various embodiments, OS 48 may use various techniques for keeping an Activity in the background even though the app processes the Activity as if it is in the foreground. For example, preload agent 50 may override one or more final system calls that cause the Activity window to be displayed on display screen 56 of user device 24. As another example, preload agent 50 may associate the Activity with a virtual Display, which is not linked to an actual physical display. The use of virtual Displays for preloading is explained in detail below.

In some embodiments, preloading of an Activity comprises the following steps, or a subset thereof, possibly in a different order:

OS 48 decides that a certain Activity, of a certain app 26, is to be preloaded.

The OS grants the app permission to act as if the app runs in the foreground, as opposed to the possibly more restricted background state, but in actuality the OS keeps the app in the background. For example, the OS may grant the app permission to launch Activities.

If the process of the app in question is not alive, the OS creates an app process for the app.

If the Activity is not already associated with a Task, the OS creates a preloaded Task 96 for the Activity.

The OS marks the Activity as a preloaded Activity 92. This marking can be performed, for example, by marking the Activity itself, by marking the preloaded Task that holds the Activity, or implicitly, e.g., by placing the preloaded Task in a preloaded task Stack 100 that is marked as such, and/or by placing the preloaded Task in a preloaded Task Stack 100 which itself is marked as preloaded either explicitly or implicitly by placing that preloaded Task Stack in a preloaded Virtual Display 108.

If the preloaded Task 96 is not already associated with a preloaded Task stack 100, the OS creates a preloaded Task stack and associates the preloaded Task to this Task stack, or alternatively associates the preloaded Task with an existing preloaded Task Stack. In some embodiments the OS may maintain a single preloaded Task stack, which is either created on demand or ahead of time, or multiple Task stacks. For example, the OS can create a preloaded Task stack for each app, or for each preloaded Task.

In some embodiments, if the preloaded Task Stack 100 is not already associated with a preloaded Virtual Display 108, the OS creates a preloaded Virtual Display and associates the preloaded Task Stack to this preloaded Virtual Display, or alternatively associates the preloaded Task Stack with an existing preloaded Virtual Display. In some embodiments, the OS may maintain a fixed number of preloaded Virtual Displays, which are either created on demand or ahead of time, or a dynamic number of preloaded Virtual Displays. For example, the OS can create a preloaded Virtual Display for each app, or for each preloaded task Stack, or for each preloaded Task.

In some embodiments, the OS launches and initializes the app using the Activity's normal lifecycle events (e.g., in Android, using the app's OnCreate( ) method). In alternative embodiments, the OS launches and initializes the app using an event dedicated for the initialization of the app due to preload, e.g., OnCreateForPreload( ).

In some embodiments, the OS creates the preloaded Activity in the background, i.e., without displaying the Activity to the user, and calls the app's initialization code, using the Activity's normal lifecycle callbacks, e.g., OnCreate( ). Alternatively, the OS may create the preloaded Activity in the background, and call its initialization code, using an event dedicated for initializing the Activity due to preload, e.g., OnCreateForPreload( ).

The OS simulates the Activity transitioning to foreground, but in actuality keeps the Activity hidden from the user (as if the Activity was in the background), using the "foreground simulation" mode. In some embodiments, but not necessarily, foreground simulation allows the Activity to render in full while in the background.

Following a period of foreground simulation, the OS changes the state of the Activity to a normal background Activity.

In some cases, the user may enter a preloaded Activity (without being aware of the fact that the Activity is preloaded), for example by invoking the app. In such a case, the Activity should exit the preload state. User entry to a preloaded Activity may comprise the following steps or a subset thereof:

The OS marks the Activity as a normal, non-preloaded Activity (if currently marked otherwise).

The OS verifies that the Task holding the Activity is not a non-preloaded Task. As applicable, this verification can be performed by re-designating the previous Task of the Activity (the preloaded Task) to be a non-preloaded Task, or by moving the Activity to a different, possibly new, non-preloaded Task.

The OS verifies that the non-preloaded Task, which now holds the Activity, is associated with a non-preloaded Task stack. In some embodiments, the OS removes the non-preloaded Task from the preloaded Task stack, and re-parents the task into either an existing or a new, non-preloaded task Stack. In some embodiments, the OS just marks the existing Task Stack which holds the non-preloaded Task as non-preloaded. This may be done either explicitly, or implicitly by re-parenting the existing Task Stack into a non-preloaded target Display.

In some embodiments, the OS verifies that the display holding the non-preloaded Task Stack is associated with a non-preloaded Display. In some embodiments this includes re-parenting the Task Stack into a non-preloaded target Display.

The OS makes the preloaded Activity visible to the user, moving it to the regular foreground state.

The OS calls any relevant callback functions which may relate to the exiting of the Activity or the app from the preload state.

Figure 4:
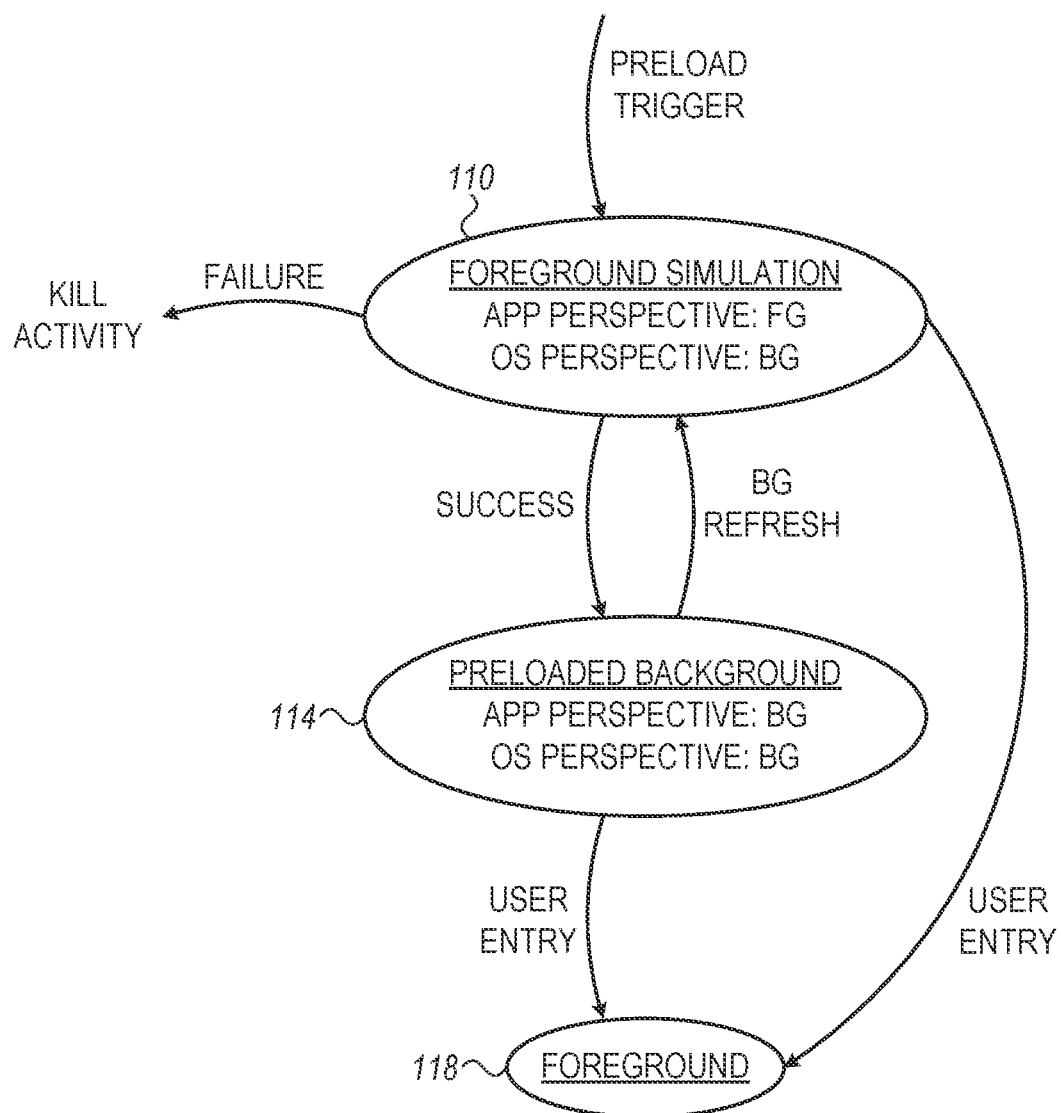
FIG. 4 is a state diagram that schematically illustrates preloading of an Activity, in accordance with an embodiment of the present invention.

FIG. 4 is a state diagram that schematically illustrates a preloading process, in accordance with an embodiment of the present invention. This state diagram can be used by OS 48, possibly with certain variations, either for preloading an Activity that belongs to a certain app, or from preloading the app itself. An Activity that is preloaded using this state diagram may be, for example, a start-up Activity of an app or an Activity that is part of the in-app content. For simplicity and clarity, however, the description that follows refers mainly to preloading of an individual Activity. Preloading of apps is addressed in greater detail further below.

The preloading operation begins with a preload trigger, i.e., an event that causes OS 48 to decide to preload the Activity. In response to the preload trigger, preload agent 50 transitions the Activity to a "foreground simulation" state 110. As explained above, in this state the app treats the Activity as a foreground Activity, whereas the OS treats the Activity as a background Activity. While the Activity is in the foreground simulation state, agent 50 launches the Activity in the background and pre-renders it, at least partially.

At some stage, agent 50 decides to end the foreground simulation. Several example completion criteria for ending the foreground simulation are discussed further below. Assuming no error occurs during foreground simulation, preload agent 50 transitions the Activity from foreground simulation state 110 to a "preloaded background" state 114. If an error occurs during foreground simulation, preload agent 50 may terminate ("kill") the Activity.

In the preloaded background state, both the OS and the app treat the Activity as a background Activity. In this state the Activity is static and waiting in the background. In some embodiments, while the Activity is in preloaded background state 114, preload agent 50 may decide to refresh the Activity in the background. In such a case agent 50 transitions the Activity back to foreground simulation state 110.

Upon user entry, e.g., when the user launches the app by clicking on the app's icon, agent 50 transitions the Activity from preloaded background state 114 to a "foreground" state 118. In this state the Activity becomes visible to the user. By virtue of the preparation and pre-rendering operations, which were performed in the foreground simulation state, the transition to foreground state 118 is fast. As seen in the figure, direct transition from foreground simulation state 110 to foreground state 118 is also possible, in case of user entry during foreground simulation.

The state diagram of FIG. 4 is an example state diagram that is depicted purely for the sake of conceptual clarity. In alternative embodiments, OS 48 may carry out the disclosed technique using any other suitable configuration of states and transitions. Additional implementation details and possible variations are given below. Foreground simulation state 110 and preloaded background state 114 are also referred to jointly as a "preload state".

In some embodiments, in an Android implementation, upon entry into foreground simulation state 110, agent 50 sets the Activity to a 'resumed' state, marks the Activity and its windows as 'visible', and marks the Activity to be in 'focus'. Nevertheless, from the user's perspective, the Activity is being rendered to the background, and is therefore invisible to the user. Upon transitioning from foreground simulation state 110 to preloaded background state 114, agent 50 changes the 'visible' and 'focused' signals of the Activity back to indicate that the Activity is not visible and not in focus, with any related callbacks invoked, and in addition changes the Activity state to 'paused' and/or to 'stopped'.

In some embodiments, agent 50 transitions an Activity into and out of foreground simulation state 110 using existing lifecycle events of the Android OS that relate to entry into and exit from foreground. These lifecycle events may comprise, for example. OnStart( ) and/or OnResume( ) for entering foreground simulation, and OnPause( ) and/or OnStop( ) for exiting foreground simulation. This sort of implementation simplifies the integration of the app with the preloading feature, since the app is able to use its normal, non-preload. Activity related code flows.

In alternative embodiments, agent 50 uses new, dedicated events for transitioning an Activity into and out of foreground simulation state 110. These new lifecycle events are dedicated for preload operations, and are different from the events used for normal Activity handling. Such dedicated events may comprise, for example, OnSimulatedStart( ), OnSimulatedResume( ), OnSimuatedPause( ), OnSimulatedStop( ), etc.

In some embodiments, OS 48 notifies the app of the fact that the Activity is being preloaded. Such a notification may be performed, for example, using a suitable Application Programming Interface (API) provided by the OS to the app. For example, an API of the form 'boolean isPreloaded (Activity activity)' can be made available to the app, e.g., by a Software Development Kit (SDK). This method allows the app to check whether a certain Activity is preloaded. When the activity parameter is omitted, the query/notification is interpreted as a general query/notification as to whether the app itself is considered preloaded.

In some embodiments, when an app or Activity is being preloaded, the app refrains from performing certain actions which the app prefers to perform only when the app/Activity actually being used by the user. Such deferred actions may comprise, for example, running analytics code, fetching and rendering of certain content, fetching and rendering of content that is not immediately displayed to the user upon entry, and the like. In some embodiments, OS 48 provides the app with an API (e.g., by an SDK) that allows the app to register one or more callback functions to be used upon user entry after preload. The OS calls these functions upon user entry to a preloaded Activity or preloaded app. This feature enables the app to complete any actions that were skipped during preloading, e.g., run relevant analytics code, refresh the previously preloaded UI, start video playback, etc.

As noted above, preload agent 50 may use various completion criteria for deciding to end foreground simulation for a certain Activity, and to transition to preloaded background state 114. In one embodiment, agent 50 continues the foreground simulation until the Activity is fully rendered in the background, and only then transitions to preloaded background state 114. In other embodiments, the foreground simulation stage is limited in time to not exceed a defined time-out duration. The time limit may be implemented, for example, by using a programmatic timer and/or by using an API supplied to the app (e.g., by an SDK).

In one embodiment, no API is used, and time-out expiry indicates that preloading is completed successfully. Upon successful completion, agent 50 considers the preloaded Activity suitable for future display, and transitions from "foreground simulation" to "preloaded background." As noted above, if the app indicates that an error occurred during preloading, agent 50 may terminate the preload procedure, e.g., by destroying the Activity/app.

In another embodiment, in addition to the time-out mechanism, OS 48 provides the app with an API that enables the app to indicate whether preloading has succeeded or failed. If the app indicates that preloading has succeeded, the OS acts as if the timer has expired, stops the timer and transitions to "preloaded background." If the app indicates that the preloading has failed (e.g., due to a network problem when fetching content to be rendered), the OS may terminate the preloading procedure, e.g., by destroying the Activity/app being preloaded. In an embodiment, if the time-out expires before the app indicates successful preloading, the OS may regard the preload as failed, and may terminate the preloading procedure, e.g. by destroying the Activity/app being preloaded.

The above-described failure scenarios are important to consider, in order to ensure that OS 48 does not display an Activity whose preloading has failed, and thus ensure that preloaded content shown to the user is intact. For example, if a network error occurs while an app is being preloaded, the failure scenario avoids showing an error to the user later, where the error condition may no longer be in effect.

Background Preloading of Activities Using Foreground Lifecycle Events

Figure 5A:
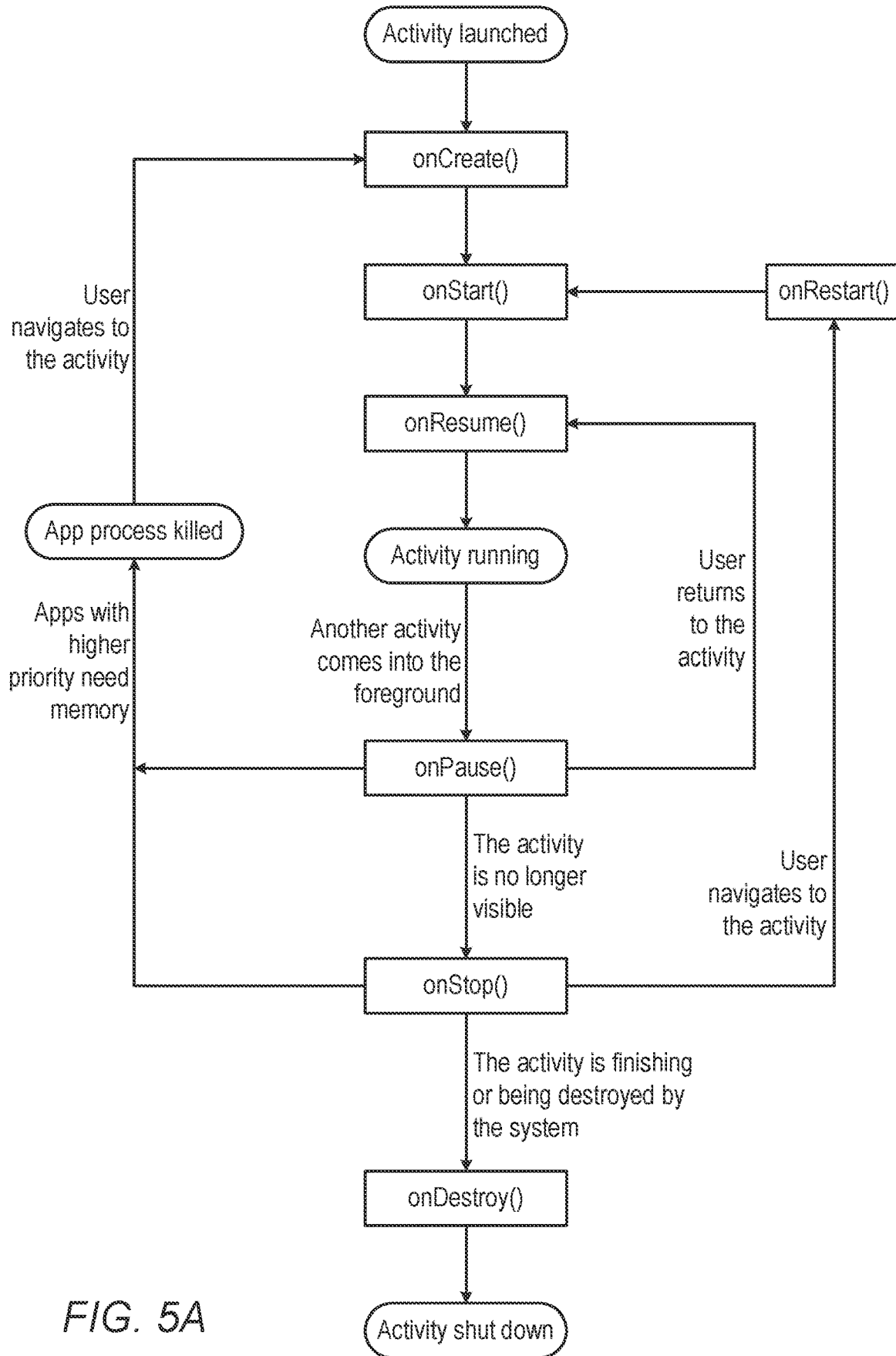
FIGS. 5A and 5B are state diagrams that schematically illustrate lifecycle states of a foreground-loaded Activity and of a background-preloaded Activity, respectively, in accordance with an embodiment of the present invention.
Figure 5B:
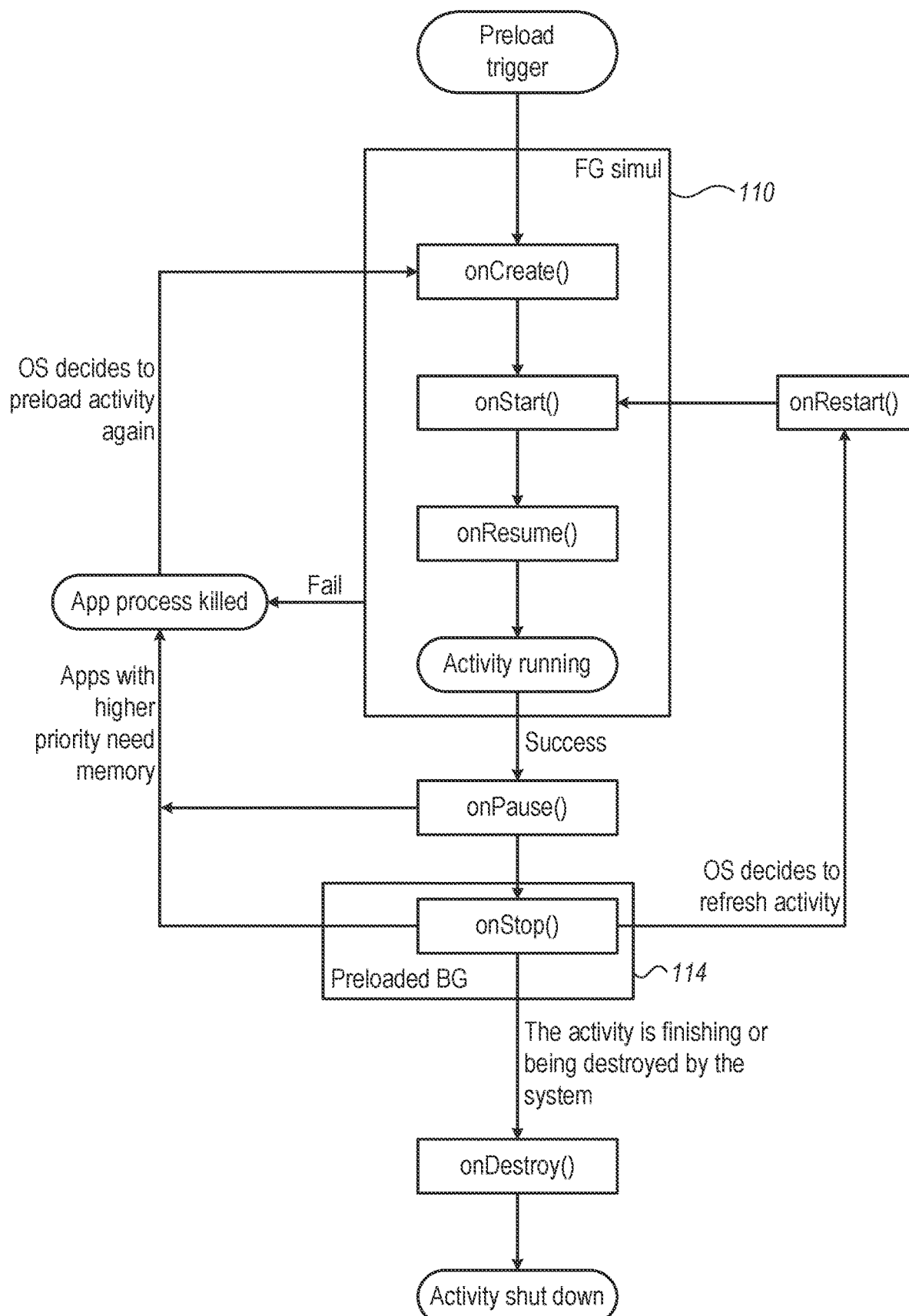

FIGS. 5A and 5B are state diagrams that schematically illustrate lifecycle states (also referred to as lifecycle events) of a foreground-loaded Activity and of a background-preloaded Activity, respectively, in accordance with an embodiment of the present invention. FIGS. 5A and 5B demonstrate how, in some embodiments, background preloading of Activities may be implemented using existing OS lifecycle events/states that are designed for conventional foreground processing of Activities.

As seen in FIG. 5A, the lifecycle of a foreground Activity begins when the Activity is launched. The Activity then passes through the onCreate( ), onStart( ) and onResume( ) states, which end with the activity running.

If another Activity comes into the foreground, the original Activity transitions to the onPause( ) state. After a certain time, and when the Activity becomes no longer visible, it proceeds to the onStop( ) state. If the Activity finishes execution or is destroyed by the OS, the Activity passes to the onDestroy( ) state, and is then shut down.

When in the onPause( ) state, if the user returns to the original Activity, the Activity returns to the onResume( ) state and then continues running. Also in the onPause( ) state, if an app having higher priority compete for memory resources, the OS may kill the app process of the Activity. Later, if the user navigates to the Activity, the activity starts from the onCreate( ) state.

When in the onStop( )state, if the user navigates to the Activity, the Activity passes to the onRestart( ) state, and on to the onStart( ) state. Also in the onStop( ) state, if an app having higher priority compete for memory resources, the OS may kill the app process of the Activity. Later, if the user navigates to the Activity, the activity starts from the onCreate( ) state.

FIG. 5B illustrates a possible use of the Android foreground lifecycle states of FIG. 5A in preloading an Activity, in accordance with an embodiment of the present invention. In this example, the lifecycle of a preloaded Activity begins with a preload trigger. In response to the preload trigger, preload agent 50 transitions the Activity to foreground simulation state 110 (as in FIG. 4 above). In the present example the flow of the foreground simulation process is implemented using the onCreate( ), onStart( ) and onResume( ) states. For a preloaded Activity, however, as opposed to a foreground Activity as in FIG. 5A, OS 48 keeps the Activity in the background, e.g., by overriding system calls that display the Activity on display screen 56 of user device 24.

The transition condition from "Activity running" to the onPause( ) state also differs between a foreground Activity (FIG. 5A) and a preloaded Activity (FIG. 5B). For a preloaded Activity, agent 50 transitions the Activity to the onPause( ) state upon successful completion of the foreground simulation. If foreground simulation fails, e.g., due to a network problem, the OS may destroy the app process of the Activity as described above, possibly in addition to finishing of the preloaded activity From the onPause( ) state the preloaded Activity proceeds to preloaded background state 114, which in the present example is implemented using the onStop( ) lifecycle state.

When in the onStop( ) state, if the OS (typically agent 50) decides to refresh the Activity, the Activity passes to the onRestart( ) state, and on to the onStart( ) state. If the Activity has been killed by the OS, the OS may later decide to preload the Activity again. In such a case the activity passes back to the onCreate( ) state.

For the sake of clarity, FIG. 5B does not show transitions that are triggered by the user navigating to the Activity. Such triggers cause the Activity to pass to foreground mode, not to foreground simulation. For example, user navigation to the Activity when in the onStop( ) state will cause the Activity to pass to the onRestart( ) state but in foreground mode; user navigation to the Activity when in the on Pause( ) state will cause the Activity to pass to the onResume( ) state but in foreground mode; and user navigation to the Activity after it has been killed state will cause the Activity to pass to the onCreate( ) state but in foreground mode.

The lifecycle states/events and transition conditions described above are depicted purely by way of example. In alternative embodiments, any other suitable arrangement of lifecycle events/states can be used. Further aspects of implementing preload using OS lifecycle events are addressed in U.S. Provisional Patent Application 63/128,220, cited above.

Preloading of User Applications

The description up to this point referred mainly to preloading of individual Activities. In some embodiments, preload agent 50 of OS 48 uses the disclosed techniques for preloading a user app 26 as a whole, before the user requests activation of the app. Preloading an app (referred to herein as "AppPreload") typically involves preloading of a selected subset of the app's Activities, thereby reducing the app start-up latency significantly.

In some embodiments, in preloading an app, agent 50 follows and simulates the normal app startup sequence, by preloading the app's entry-point Activity (sometimes referred as the launcher Activity or splash screen). Then, agent 50 may optionally preload one or more additional Activities that the app normally starts as part of its normal startup sequence. Agent 50 typically preloads each selected Activity, entry-point or otherwise, using the techniques described above, e.g., using foreground simulation.

In some embodiments, if the app invokes an Activity while the app is being preloaded, agent 50 verifies that the invocation is preload-initiated, as opposed to user-initiated. If so, agent 50 preloads the Activity. In some embodiments, if such an Activity would have normally required a new Task, agent 50 creates a new preloaded Task for that Activity and associates that Activity with the new preloaded Task. Further aspects relating to distinguishing between preload-initiated or user-initiated Activities are addressed in PCT International Publication WO 2019/171237, cited above.

In some embodiments, agent 50 places the various Activities preloaded during the launch sequence in the same preloaded Task. In some embodiments, agent 50 creates preloaded Tasks according to the app's normal launch sequence, wherein for each Task that would have been created normally, agent 50 creates a matching preloaded Task. In some embodiments, each preloaded app is allocated a separate preloaded Task stack, which contains the various preloaded Tasks and preloaded Activities of that app. In some embodiments, each preloaded app is allocated a separate preloaded virtual Display, which contains the app's preloaded Task Stack.

In some embodiments, when the user enters the preloaded app, agent 50 ensures that the app will be displayed in its initial state. In some embodiments, when preparing to preload app, agent 50 checks whether the app already has one or more living Activities. If so, agent 50 kills the living Activities and Tasks of the app before beginning preloading. Agent 50 may, for example, destroy the app processes that hold the living Activities and Tasks. In some embodiments, upon preloading an app, if the app already has one or more living processes, agent 50 destroys and/or finishes them before beginning preloading.

In some embodiments, agent 50 preloads an app only in response to verifying that the app is not currently in the foreground.

In some embodiments, agent 50 will preload an app only in response to verifying that the app does not have any living process. In some embodiments, agent 50 will preload an app only in response to verifying that all the processes that are normally started during normal app launch are not alive. In some embodiments, agent 50 will preload an app only in response to verifying that certain specific processes are not alive. The selection of such specific processes may depend on a defined configuration.

In some embodiments, agent 50 will preload an app only in response to verifying that the app does not have processes which have any live app components of one or more specified types. Such types may comprise, for example, Activities, broadcast receivers, services, content providers, widgets, notifications, or any other suitable type of app component.

In some embodiments, agent 50 will preload an app only in response to verifying that the app does not have any live Activities. In some embodiments, agent 50 will preload an app only in response to verifying that the app does not have specific Activities alive, referred to herein as target Activities. The target activities may be configured per app, e.g., via an API. In some embodiments, the app configures exactly one target activity, referred to as its "main Activity", which is normally preloaded during the preloading of the app.

In other embodiments, agent 50 may preload an app even though the app has live components, but only if the app is regarded as "Not-Recently-Used" (NRU). An app will be regarded as NRU, for example, if the time elapsed since the app was last used by the user exceeds a defined value.

Typically, as noted above, the recents screen of OS 48 is unaffected by preloading of apps. Thus, when the recents screen requests a Task that was replaced with a preloaded. Task, OS 48 provides the recents screen with the up-to-date Task, instead of attempting to bring the previous Task to the foreground (possibly failing because the previous Task no longer exists) or creating a new Task. In some embodiments, this feature is implemented by maintaining a mapping between the latest Task saved by the recents screen and the latest preloaded Task, per app (e.g., per app package), per user. In other embodiments, this feature is implemented by maintaining a mapping between {app package, user} and the latest preloaded Task for the {app package, user}.

In some embodiments, app usage metrics maintained by OS 48 are unaffected by preloading of apps. In this context, app usage metrics may comprise, for example, last-used timestamp for each app or app package, process priority ordering that is usually based on recent usage times (e.g., Least-Recently-Used order), previously used process, and the like. In some embodiments, agent 50 preloads apps according to least-recently-used usage metrics. In some embodiments, agent 50 preloads an app following a user exit from the app. In some embodiments, agent 50 preloads an app following a user exit from the app, in case such exit caused one or more of the app's Activities to be killed. This scenario may occur, for example, as a result of the app being swiped-off from the recents screen, or by exit using the back button.

In some embodiments, preloading an app does not affect decisions of OS 48 relating to initiation of power-saving states, e.g., whether or not and when to initiate App Standby. Thus, for example, preloading of an app is not regarded app usage for the purpose of power-saving decisions.

In some embodiments, during the preloading of an app, OS 48 temporarily turns off battery saving states, e.g., in order to allow the app to download and/or to render content.

In some embodiments, when preloading of an app is completed, the app and all of its Activities are moved to a normal background state, e.g., paused or stopped states.

In some embodiments, preload agent 50 sets an upper limit on the overall time duration of preloading the app. This upper limit may be set instead of, or in addition to, the time limit on preloading of each individual Activity (the time-out before transitioning from foreground simulation state 110 to preloaded background state 114 in FIG. 4). The time limit can be implemented, for example, using a programmatic timer and/or using an API provided to the app (e.g., by an SDK)—to the time-out implementation relating to individual Activities. In an example embodiment, an API may allow the app to declare that preloading of the app completed successfully, as opposed to successful preloading of an individual Activity.

In some embodiments, when the user enters a preloaded app, OS 48 presents some preliminary UI animation and/or Starting Window before displaying the preloaded Activity or Activities. In one embodiment this animation and/or Starting Window is the same as would be displayed if the app were not preloaded. In another embodiment, the OS presents a certain animation and/or Starting Window when the app is preloaded, and a different animation and; or Starting Window when the app is not-preloaded. In the latter case, the OS may use an animation and/or Starting Window dedicated specifically for the case of user entry after preload, e.g., as an indication to the user that the app being entered was preloaded.

In some embodiments, the preloading of apps supports a multi-user environment in user device 24. For example, in some embodiments OS 48 ensures that preloaded Tasks of one user cannot be accessed or otherwise used by another user. In some embodiments the OS maintains a different preload policy per user.

In some embodiments, OS 48 gives preloading a lower processing priority than UI foreground-related jobs. In some embodiments, processing resources allocated to preloading are confined to a small portion of the available processing resources, after prioritizing UI foreground-related jobs. In some embodiments, preloading is performed under Android's background Cgroup.

In some embodiments, OS 48 provides testing tools for app developers, in order to simulate the preloading of apps. In some embodiments in which preloading of apps can be done in multiple modes, e.g., as described in above-cited PCT Application PCT/IB2020/057046, the simulation of preloading supports all of the possible modes.

In some embodiments, app preloading is used to accelerate the start-up time of apps, such as games, in which a substantial processing effort occurs upon app launch.

In some embodiments, app preloading is performed in such a way that the processing being performed during preload remains relevant to the user for a substantial duration of time. For example, preloading may exclude content items that change rapidly, e.g., by more than a predefined rate. One example is preloading at least part of the landing page of an app game) whose landing page rarely changes over time. This allows the OS to preload such apps, e.g., games, only once in a while and possibly during preferable times (e.g., when the user device is connected to a power supply), and still maintain high likelihood for the preloaded app to be used by the user as it is, without needing to refresh the preloaded content (e.g. upon user entry).

In some embodiments, app preloading is used to accelerate the startup time of apps that require specific device resources (e.g., GPU resources) such as games. In some embodiments, preloading of such apps is performed when device resources are available/abundant.

In some embodiments, app preloading excludes fetching of content over the network. In some embodiments, accessing to the network is prohibited by the OS during preloading, in some embodiments, app preloading is limited to rendering of content that already exists in the user device (e.g., in Flash memory), e.g., content that is embedded in the app itself or resides in a temporary cache (e.g., cache of items previously fetched from over the network, such as cache 52 of FIG. 1).

In some embodiments, at least some of the app preloading functionality is integrated into an app development framework or 3$^{rd}$-party SDK, e.g., a game framework (also known as a game engine) or an analytics SDK. Such an app development framework is referred to herein as an App Preloading Integrated Framework. In some embodiments such integration is implemented by supplying a suitable plugin for such framework or SDK. In some embodiments, using an App Preloading Integrated Framework replaces some or all of the app preloading API integration steps (which would otherwise be needed by apps, in order to utilize or better utilize app preloading). In some embodiments, using an App Preloading Integrated Framework reduces or simplifies the integration effort of apps with app preloading API. In some embodiments, the app preloading API is given to apps as part of an Integrated Framework.

In some embodiments, when deciding whether or not to preload an app, OS 48 considers the type of app that is to be preloaded, e.g., that the app is a game. In some embodiments, when deciding whether or not to preload an app, OS 48 may consider the kind of framework or frameworks used by the app, and whether or not it is an App Preloading Integrated Framework.

Preloading of In-App Content

In some embodiments, preload agent 50 of OS 48 uses the disclosed Activity preloading techniques, e.g., techniques relating to foreground simulation, for preloading in-app content, e.g., in-app Activities. Preloading of in-app content is referred to herein as "InAppPreload". In the present context, the term "in-app Activity" refers to an Activity that is not immediately displayed to the user upon app launching, but possibly displayed later based on an event such as user interaction with the app.

Note that preloading of in-app Activities may be performed both for apps that are kept in the background (e.g., preloaded apps) and for apps that run in the foreground (e.g., apps that were launched and are currently in use by the user). In some embodiments, the preloading of in-app Activities is performed while the app is in the background, after the app itself has been preloaded. In either case, preloading of in-app Activities allows a significant reduction of the latency experienced by the user. The latency is reduced since the Activity is at least partially ready in memory when the app needs to display it, e.g., in response to a user click of an in-app link.

In some embodiments, agent 50 in OS 48 maintains a cache of preloaded in-app Activities. This cache is typically implemented in the user device RAM. Each Activity preloaded by the OS is saved to this cache. Activities which may be preloaded, or intents to create such Activities, are assigned by the OS respective unique and stable identifiers (IDs) that are used as their cache keys. Typically, although not necessarily, the app initially assigns the ID by calculating it over the intent to create the Activity. When the app requests to launch an in-app Activity, agent 50 calculates the unique ID of that Activity and compares it against the unique IDs of the Activities cached in the in-app activity cache. If a match is found, OS 48 displays the cached Activity instead of creating a new Activity. If no match is found, OS 48 creates the Activity as it would normally be created without preloading.

In some embodiments, the app uses an API provided by the OS (e.g., through an SDK) to map Activities, or intents to create an Activity, to a unique and stable ID.

In some embodiments, agent 50 assigns each Activity in the in-app Activity cache an expiry timestamp. In such embodiments, OS 48 serves a preloaded Activity from the cache (instead of creating a new Activity) only if the expiry time of the cached Activity has not expired. In some embodiments, upon expiry of an Activity, the Activity is destroyed. Agent 50 typically assigns the expiry timestamp upon preloading of the Activity, and sets the expiry time as the preloading time plus a certain Time-To-Live (TTL) duration. In some embodiments, the TTL is fixed across all in-app Activities and across all apps. In some embodiments, the TTL is fixed across all Activities of the same app. In some embodiments, the TTL is set dynamically. In some embodiments the TTL is set dynamically based on a configuration set by the app, e.g., through an API.

In some embodiments, the number of Activities kept in the in-app activity cache is limited. In some embodiments, agent 50 limits the total number of Activities that may be resident in memory for a given app, including both preloaded Activities and non-preloaded Activities, which are Activities regularly launched by the app. In some embodiments, the limit on the number of cached Activities is fixed. In other embodiments the limit is set dynamically and may depend on a current state of the user device (e.g., on available resources), hardware type (e.g., total RAM and/or CPU power), app type, app usage frequency, app usage pattern, or on any other suitable factor.

In some embodiments, agent 50 assigns each preloaded in-app Activity its own separate preloaded Task 96. In other embodiment, agent 50 groups (e.g., stacks) preloaded in-app Activities in multiple preloaded Tasks 96. In yet other embodiments, agent 50 groups (e.g., stacks) all preloaded Activities in a single preloaded Task 96. In some embodiments, each preloaded Task 96 resides in its own preloaded Task stack 100. In some embodiments, all preloaded Tasks 96 reside within the same preloaded Task stack 100. In yet further embodiments, all preloaded Tasks of the same app reside within the same preloaded Task Stack. In some embodiments, the preloaded Task Stacks used for in-app Activities reside within a preloaded Virtual Display 108, as will be explained in detail below.

In some embodiments, preload agent 50 selects in-app Activities to preload, based on suggestions and ranking (prioritization) of potential target Activities to be preloaded. In some embodiments, OS 48 provides the app an API for suggesting and ranking potential target Activities to be preloaded. In some embodiments, the app may call the API at various points in time while the app is running, in order to adapt the suggested and ranked potential target Activities, e.g., to the momentary state of the app, e.g., depending on which content items are currently reachable and/or visible to the user.

In some embodiments, when an app having preloaded in-app Activities is moved by the OS from the foreground to the background, in-app Activities that were preloaded while the app was in the foreground are kept for a limited duration. This feature allows sensible usage of RAM, while still allowing the user to switch to a different app and back without losing the preloaded Activities. In some embodiments, the limited duration is fixed across all Activities and all apps. In other embodiments, the limited duration is fixed across all Activities of the same app. In yet other embodiments, the limited duration is set dynamically. In some embodiments the limited duration is set dynamically based on configuration set by the app, e.g., through an API.

In some embodiments, agent 50 preloads in-app Activities one-by-one, i.e., not concurrently. In some embodiments, agent 50 preloads in-app Activities concurrently, and possibly maintains a concurrency limitation. The limitation defines the number of concurrent preloads that the OS will perform at any given point. The OS may set this limitation to a fixed size or dynamically, depending on current conditions. Setting a higher concurrency limitation may contribute to the activity cache hit-rate, and may also reduce battery consumption due to bundling of preload actions. On the other hand, a higher concurrency limitation may consume more device resources such as CPU and GPU processing. Therefore, the concurrency limitation (either dynamic or static) setting may depend on factors such as current device state (e.g., available resources), hardware type (e.g., total RAM, CPU type), app inputs (e.g., projected processing required or allocated to preload) and/or whether the app is running in foreground or background mode.

In some embodiments, when the user enters a preloaded in-app Activity, OS 48 shows a preliminary UI animation before displaying the preloaded Activity. Such UI animation may be the same animation which would have been shown had the user entered a non-preloaded Activity, or a different animation (e.g., an animation dedicated specifically for the case of user entry after preload). A dedicated animation may comprise, for example, an indication for the user that he or she is entering an Activity that was preloaded.

In some embodiments, the in-app Activity preloading functionality is integrated into an app development framework or $3^{rd}$-party SDK, e.g., a game framework (also known as a game engine), or an analytics SDK. Such an app development framework is referred to herein as an InApp-Preload Integrated Framework. In some embodiments such integration is implemented by supplying an InAppPreload plugin for such a framework or SDK. In some embodiments, using an InAppPreload integrated framework replaces some or all of the InAppPreload API integration steps (which would otherwise be needed by apps, in order to utilize or better utilize InAppPreload). Using an InAppPreload integrated framework reduces or simplifies the integration effort of apps with InAppPreload API. In some embodiments, the InAppPreload API is given to apps as part of an integrated framework.

In some embodiments, when deciding whether or not to preload in-app Activities, agent 50 considers the resources required by an Activity to preload. Such resources may comprise, for example, power drain, use of cellular data, memory, CPU resources, GPU resources, or any other relevant resource. In some embodiments, agent 50 learns this information over time, e.g., by measuring the resources being consumed during preload. In some embodiments, the app at least partially declares (e.g., through an API) its requirements for at least part of such device resources.

In some embodiments, OS 48 supplies tools for app developers, in order to simulate the preloading of in-app Activities.

Additional Preloading Features

Preloading Using Virtual Displays

The concept of preloaded virtual Displays 108 was described above with respect to FIG. 3. In various embodiments, preload agent 50 of OS 48 may use preloaded virtual Displays 108 in various way to preload Activities.

In some embodiments, when preloading an app or an Activity, preload agent 50 creates the app or Activity inside a preloaded virtual Display 108. Prior to being shown to the user, e.g., in response to user entry to the app, agent 50 transfers the app or Activity to a regular Display and displays it there. The regular Display to which preloaded content is transferred is referred to herein as a "target Display."

In some embodiments, OS 48 maintains only one regular Display (e.g., default display 104 of FIG. 3), which serves as the target Display for all preloaded apps and Activities. In other embodiments, OS 48 maintains multiple regular Displays. In such embodiments, agent 50 typically determines the target Display based on the semantics of the user request.

For example, the app or Activity may be transferred to the regular Display in which the app or Activity would normally have been launched without preloading. In some embodiments, the app or Activity is transferred from the preloaded virtual Display to a regular Display upon user request to see the app's content, e.g., upon the user clicking on the app's icon.

When using foreground simulation as described above, agent 50 may transfer the app or Activity from a preloaded virtual Display 108 to a regular Display (e.g., default Display 104) when foreground simulation is complete. In the regular display, agent 50 places the app or Activity in a background state, ready to later be used by the user.

In some embodiments, OS 48 maintains a single preloaded virtual Display 108, which is used for all preload operations. In such embodiments, agent 50 limits preload operations (e.g., the duration of foreground simulation, or the entire duration of an app in preload state) to one preload operation at a time, in order to avoid cross-effects between different preloaded apps. The single preloaded virtual Display 108 can be created as part of the system initialization, or on-demand upon the first time a preload operation is requested.

In alternative embodiments, OS 48 creates and maintains multiple preloaded virtual Displays 108, e.g., per preloaded Task stack 100, per preloaded app, per preloaded Task 96, or per preloaded Activity 92. In an example embodiment, agent 5 may create a preloaded virtual Display 108 even for one preload operation, and destroy the preloaded virtual Display after the preloaded content is transferred to a regular Display. Multiple preloaded virtual Displays may exist in parallel, each for a different preload operation. This fine granularity helps avoiding cross-effects of a preload operation over other Tasks, Task stacks, apps, or Activities, preloaded or otherwise. As an alternative to destroying a preloaded virtual Display 108, the preloaded virtual Display may be cached by agent 50 in memory, for later use by a different preload operation.

In some embodiments, agent 50 may maintain a pool of preloaded virtual Displays 108, which are created with different properties and/or state. In such an embodiment, agent 50 performs each preload operation in the preloaded virtual Display that matches its desired target properties and state. For example, agent 50 may maintain two preloaded virtual Displays 108 one for landscape orientation and the other for portrait orientation. Apps that force a landscape orientation will be preloaded in the former, while apps which can use any orientation and are expected to be used in portrait, will be preloaded in the latter. When using a pool of preloaded virtual Displays, it may be permitted to perform several preload operations simultaneously within the same preloaded virtual Display, since these operations share the same target properties and state.

As another example, when the OS uses several viable regular Displays into which apps can be launched by the user, each with its own different properties, agent 50 may create a corresponding preloaded virtual Display that matched each of the regular Displays in each of their expected states. The latter embodiment is useful, for example, in cases where virtual Displays are limited or expensive resources, e.g., due to construction or maintenance costs.

As noted above, a preloaded virtual Display 108 is designed as a temporary placeholder for content that is later transferred to a regular Display. As such, a given preloaded virtual Display should resemble the corresponding regular Display (the target Display) as closely as possible. To that end, agent 50 typically sets a preloaded virtual Display to emulate some or all of the properties of the target regular Display, such as its height and width.

As the properties of a preloaded virtual Display are set to emulate a regular Display, agent 50 should specify which regular Display to emulate. The emulated regular Display is typically chosen to be the target Display onto which the app is expected to be transferred, as defined above. In practice, however, in many cases there is only one such target Display (e.g., default Display 104 of FIG. 3) which is associated with display screen 56 of the user device. In these embodiments, any preloaded virtual Display 108 typically emulates the properties of the default physical Display 9 and thus the properties of display screen 56.

In some embodiments, the target Display comprises certain system decorations—UI elements such as a status bar or navigational components. These decorations take up some of the display area available for apps. Preloaded virtual Displays should typically mirror these components in order to make sure that preloaded apps are rendered on an area identical to the area available in the target Display. Thus, in some embodiments agent 50 creates decorations in a preloaded virtual Display similarly to the way the decorations are created for the corresponding target Display. In some embodiments, agent 50 does not actually create the decorations within the preloaded virtual Display, but rather calculates and reserves the dimensions of the decorations, so that the area available in the preloaded virtual Display in reduced accordingly.

In some OSs and user devices, the orientation is a state variable of a Display. As such, encapsulating preload operations into preloaded Displays virtual allows the OS to preload apps using different orientations without affecting the regular Displays, and especially without changing the orientation of the Display the user is interacting with. In some embodiments, agent 50 determines the orientation of a certain preloaded virtual Display by negotiation with the app requirements, in a similar manner to a physical Display. For example, for an app that requires landscape orientation, the negotiation causes agent 50 to change the orientation of the preloaded virtual Display to landscape, while the default Display may remain in portrait. In other embodiments, the orientation is fixed per preloaded virtual Display.

For apps that can be used in one of several different orientations, agent 50 may determine a target orientation based on, for example, the orientation in which the preloaded content is expected to be used. Agent 50 may then set this orientation as the orientation of the preloaded virtual Display, possibly taking into account usage history of the app, the current state of the physical device, and/or other suitable factors.

Preloading Through Use of Intents

In some embodiments, OS 48 supports the use of "intents" and "intent resolution". The term "intent" refers to an advance indication of an operation to be performed. Among the various operations, an operation may be the starting of an Activity. The term "intent resolution" refers to a function of OS 48 that handles intents, resolves intents to the required operations, and optionally performing the required operations.

In some embodiments, preloading of Activities is performed as part of the intent resolution of OS 48. In these embodiments, an intent to open an Activity may be marked as a preload intent, in which case the operation to be performed is the preloading of the Activity, as opposed to regular, non-preload, launching of the Activity. In such embodiments, the intent resolution function of the OS may receive both regular intents and preload intents. In some embodiments, the non-preload intents may comprise intents to launch an Activity in response to the user entry to an existing Activity, which may be preloaded or not. In some embodiments, if a non-preload intent is received for an already preloaded Activity, the intent resolution function detects this fact and triggers the actions required upon Activity/app exit from preload state, e.g., as mentioned above.

In some embodiments, during intent resolution of preload intents, OS 48 resolves the target Activity to be preloaded, decides whether to preload it or not, and acts accordingly. In some embodiments, at least part of handling a preload intent is performed under a system lock, so that the decision to preload and the actual preloading are performed in an atomic manner, avoiding potential race conditions with the system state.

In some embodiments, the creation of the preload intents is performed in a previous stage, based on several inputs such as system events, e.g., an app being swiped-off from recents screen, an app being exited using the back button, reception of a push notification, etc.

In some embodiments, the decision to create a preload intent and/or to actually preload according to the intent depends on a preload policy, maintained by the OS. In some embodiments OS 48 maintains the preload policy through the use of a system app. For example, the preload policy may be created by the system app, and/or kept persistent in the data section of that system app.

In some embodiments, the preload policy is defined, at least in part, by considering configuration settings set by the user app, e.g., through a supplied API. Such configuration can be set by the app at any point, e.g., upon app initialization. In some embodiments, the preload policy is defined, at least in part, by considering further configuration settings, which are set by device-internal algorithms (e.g., by agent 50) and/or by server-side algorithms (e.g., by preload control unit 72 of FIG. 1). Such algorithms may comprise, for example, usage pattern analysis algorithms, artificial intelligence, machine learning algorithms, and the like.

The Reloading in Accordance with a Preload Policy Received from Network-Side Server In some embodiments, OS 48 receives a preload policy from preload control unit 72, and preload agent 50 carries out the various preloading operations in accordance with this policy. As noted above, the OS may manage the preload policy using a system app. OS 48 may obtain updates of the preload policy from time to time, e.g., over the air from preload control unit 72. In various embodiments, the preload policy may specify the following definitions and parameters, for example:

- A specification of which apps to preload and when.
- A specification of whether and which in-app content to preload.
- A specification of how much of an app component to preload (e.g., only executing some initial executable code, or pre-rendering of the app's user interface, and/or a maximal duration of foreground simulation).
- A specification of the use of preloading modes, e.g., off-line preloading and/or on-line preloading, e.g., as described in PCT Application PCT/IB2020/057046, cited above.
- A "whitelist" of apps—A limited list of apps. In some embodiments, OS 48 only allows preloading of apps that appear on the whitelist. In other embodiments, OS 48 allows preloading of apps that appear on the whitelist, in addition to apps which have integrated and called a specific API, e.g., a preload init API, provided apps e.g., via an SDK.
- A specification of the maximum duration of Foreground Simulation, either for all apps and/or specifically for some apps.

Additional aspects of managing preloading operations using a network-side server are addressed, for example, in U.S. Provisional Patent Application 63/118,068, cited above.

Preloading in an Expected Device Orientation

In some embodiments, when preloading an Activity, OS 48 defines a target device orientation (e.g., portrait or landscape) for the Activity preloading, which may be different from the current orientation of user device 24. The preloaded Activity is thus pre-rendered as if the user device is in the target orientation, while other device functionality continues normally with the actual orientation. This feature allows the preload to be used fully, even in face of orientation changes. For example, the user may be watching a video in landscape and is then predicted to open a social app after the video is done, in portrait. In such a case OS 48 may preload the predicted social app already in portrait. In some embodiments, the target orientation is selected by the OS based on the usage pattern of the app, the target Activity, and/or the orientations which the preloaded app supports.

In some embodiments, the OS may maintain a preloaded Activity in more than one orientation simultaneously, and display the Activity with an orientation matching the orientation of the user device at the time of user entry.

In some embodiments, if the orientation of the preloaded Activity does not match the orientation of the user device at the time of user entry, OS 48 destroys the preloaded Activity. In other embodiments, the OS re-renders the preloaded Activity at time of entry to match the current orientation.

In some embodiments, OS 48 may respond to orientation changes of the user device by potentially destroying preloaded Activities having a different orientation, or re-rendering such Activities to match the current orientation.

Preloading in Multi-Window

In some embodiments, OS 48 allows preloading of Activities during multi-window mode (also referred to as "split-screen" mode), even for Activities of apps that do not support multi-window. Conventionally, when an Activity needs to be launched (e.g., due to user entry) for an app that does not support multi-window, the OS checks whether the user device is currently in multi-window mode. If so, the OS may show an error message or exit multi-window mode. In some embodiments of the present invention, OS 48 may ignore this check when preloading Activities, and allow the Activity to launch in the background, as if in full screen, while keeping the user device in multi-window mode.

In addition, in some embodiments OS 48 fully utilizes preloaded Activities for instant display, even in multi-window, regardless of whether or not these Activities have been preloaded during multi-window. In some embodiments, this feature is implemented by holding all preloaded Tasks in at least one preloaded Task stack, and re-parenting the preloaded Task to the system's multi-window Task stack when the OS needs to display the preloaded Activity.

Content Enriching for Preloaded Activities

In some embodiments, the content fetched by the app to be rendered on a preloaded Activity may be of higher quality (e.g., images/videos of higher definition; 3D images instead of 2D images, etc.) than the normal content that would have been fetched during real-time Activity loading (i.e., when the Activity is created due to a user request and not due to preloading by the OS). In some embodiments, such enriching of content is accomplished by having the app request higher quality content upon preloading of Activities.

In an embodiment, in order to decide on content quality, the app may check whether or not its Activities are being preloaded by using an API, e.g., the isPreloaded( ) method mentioned above.

In some embodiments, content reduction algorithms which normally apply, are skipped during preload. For example, image quality reduction algorithms which are applied on the server side, e.g. by a Content Delivery Network (CDN), are skipped when the content is fetched for preload. In some embodiments, the skipping of content quality reduction on the server side is overridden due to an explicit request by the app, when the app performs fetching of the content. In some embodiments, a preloaded app may indicate to the server that it has a good-quality network connection, regardless of the actual network connection, to allow for higher quality content during preload. In some embodiments, a preloaded app may indicate to the server that it is fetching content during preload, to allow the server to decide on the desired content quality during preload.

Masking Unexpected Interactions While an Activity is Preloaded

In some embodiments, when an Activity is being preloaded and possibly also when it is in the background state due to preload, OS 48 masks (hides) unexpected interactions which can cause the user to be aware of the preloaded Activity. In some embodiments, the masking of such interactions includes masking of popup messages such as toasts (In Android) and error messages.

User Entry While an Activity is Being Preloaded

In some embodiments, if the user enters an app/Activity that is currently being preloaded, OS 48 stops the preloading and re-creates the app/Activity as if it was not being preloaded (e.g., from scratch). In alternative embodiments, the OS completes the preloading procedure, and in the meantime shows a predefined screen to the user. After the preload is completed, the OS removes the predefined screen and displays the preloaded Activity as it does on user entry to a preloaded Activity. Further alternatively, the OS may perform all actions required upon user entry to a preloaded Activity (as previously defined), making the preloaded Activity visible to the user, and the loading of the Activity continues while in foreground.

Avoid Preloading when CPU is Busy

In some embodiments, preloading is avoided when the user device CPU is too busy, e.g., according to a predefined or dynamically set condition. This feature can assist in increasing the likelihood that preload will complete in a timely manner and therefore can assist in not wasting resources such as power and data (e.g., due to auto-fail timer limitations as described earlier).

Preloading in Battery-Sensitive Situations

In some embodiments, preloading is assigned low priority by the OS, or even avoided altogether, in situations where power drain is sensitive. Such situations may comprise, for example, cases in which the user device battery is too low (e.g., the remaining energy is below a preconfigured threshold), when the user device enters a battery-saving state controlled by the OS (e.g., the Android Doze state), when the user device enters a battery-saving state controlled by the user (e.g., the Android Battery Saver state), or when the specific app enters an app-specific battery-saving state (e.g., the Android App Standby state).

In contrast, in some embodiments OS 48 triggers preload more liberally (e.g., more frequently) in situations where power concern is less severe than usual, e.g., when the user device is connected to external power supply.

Preload as an Instrument to Save Power/Battery

In some embodiments, the disclosed preloading techniques are used as a measure for saving power and/or battery resources. Such saving can be accomplished by using any of the following example schemes:

Usage of preload to save wasted screen time: In this scheme, preload is used to reduce power drained by the user device screen, while the user waits for the content to be loaded. In an example embodiment, the OS gives a suitable preference to preload depending on how much power is drained by the presented screen or content during the waiting time on normal (non-preloaded) launch.

Usage of preload to save power drained due to bad network conditions: In this scheme, preload is used to reduce power drained by the device networking hardware, such as cellular modem. In some embodiments, the OS gives preference to preload in cases where the expected power drain during preload due to networking is less than a certain threshold. For example, preload may be preferred in situations of good 4G or 5G coverage and/or when connected to Wi-Fi. In some embodiments, preload is preferred in cases where the preload policy estimates a high enough likelihood that the user will use the preloaded app in network conditions, which are poorer than the existing network conditions by a given threshold. For example, the OS may decide to preload an app in case the preload policy estimates a high enough likelihood that it will be used in a situation of 3G coverage, while the current situation is of good Wi-Fi.

Usage of preload to save power drained due to seriality of app usage: In this scheme, the OS performs preload concurrently (e.g., preloading of multiple apps/Activities at the same time) to reduce wasting of power due to the normal running of apps in a serial manner. Such bundling of preload operations increases the power efficiency of device hardware such the cellular modem, Wi-Fi communication hardware, CPU and GPU.

Usage of preload to save power drain due to app usage while device is not connected to an external power supply: In this scheme OS 48 gives preference to preload while the user device is connected to an external power supply and/or when the preload policy estimates a high enough likelihood that the app will be used while the device is not connected to an external power supply.

Preload as an Instrument to Allow Improved Offline Experience

In some embodiments, the disclosed preloading techniques are used to provide the user an improved offline experience. The term "offline experience" refers to the case where a user enters or attempts to use an app while the user device is offline (i.e., cannot connect to the appropriate portal 28 via the network, e.g., due to disconnection from the Internet). Improved offline experience may refer, for example, to the following advantages that may be provided during offline experience:

- Allowing an app to display content, instead of not showing any display.
- Allowing an app to display newer content than it would have shown without preloading.
- Allowing an app to display content that is new to the user, i.e., content that the user has not consumed before.

In some embodiments, OS 48 gives preference to preload in cases where the preload policy estimates a high enough likelihood that the user will use the preloaded app while the user device is offline.

Preload as an Instrument to Save Cellular Data

In some embodiments, the disclosed preloading techniques are used as a measure for saving cellular data consumption. Such saving can be accomplished, for example, by preferring preload while the user device is connected to Wi-Fi. In some embodiments, preload is done mostly or exclusively when connected to Wi-Fi, and may be inhibited otherwise. In some embodiments preload is preferred while the device is connected to Wi-Fi, in cases where the preload policy estimates a high enough likelihood that the user will use the preloaded app while not connected to Wi-Fi.

Preload in Cellular Data Sensitive Situations

In some embodiments, OS 48 gives a low preference to preload, up to the point of being avoided, in situations where cellular data consumption is extra sensitive. Such situations may comprise, for example, scenarios in which the user device is roaming, scenarios in which the user device enters a cellular-data-saving state controlled by the OS (e.g., the Android Doze state), scenarios in which the user device enters a cellular-data-saving state controlled by the user (e.g., the Android's Data Saver state), or scenarios in which the specific app enters an app-specific cellular-data-saving state (e.g., the Android App Standby state).

Defining a Cellular Data Budget for Preload

In some embodiments, OS 48 measures the cellular data consumed by preloading operations. In some embodiments, the measured cellular data consumed by preload comprises the data consumed by the app during the time it has Activities in the simulated foreground state. In other embodiments the measured data comprises the data consumed by the app during the time it has any Activity preloaded (either in the simulated foreground state or in the background). In yet other embodiments the measured data comprises the data consumed by the app during the time it has specific Activities preloaded (either in the simulated foreground state or in the background). Further alternatively, the measured data comprises the data consumed by the app during the time it has its designated "main Activity" (entry-point Activity as defined above) preloaded (either in the simulated foreground state or in the background. In some embodiments, the OS counts separately Activities preloaded as part of AppPreload (app preloading) and Activities preloaded as part of InAppPreload (preloading of in-app Activities).

In some embodiments, the OS maintains data consumption budgets for the preloaded data. In some embodiments, the OS sets an overall data consumption budget for all apps together. In other embodiments the OS sets a separate data consumption budget per app. In some embodiments, the OS maintains separate data consumption budgets per given time duration, e.g., a daily budget, weekly budget, monthly budget and so on. In some embodiments, the time duration is determined based on the user's usage pattern.

In some embodiments, the OS sets the data consumption budget to a predefined fixed parameter (e.g., 10 MB). In some embodiments, the OS sets the data consumption budget to a dynamic parameter. In some embodiments, the dynamic parameter is set based on learning of the app/device usage pattern. In some embodiments the budget of a given app for a given time period is set as a function (e.g., a linear function) of the estimated user's usage of that app the given time period.

In some embodiments, upon reaching a certain data consumption budget, the OS will refrain from triggering further preloads which affect that certain preload budget. For example, in case the data consumption budget of a given app for a given period and a given functionality set (AppPreload/InAppPreload) is exhausted, the OS does not trigger further preload for the given functionality set during the remaining time of that given period. In some embodiments, the OS keeps track of the data consumption budgets that have been consumed, and adapts the preload policy to reduce the chance of consuming that preload budget at the next given period.

In some embodiments, the preload data consumption budget is defined as part of a wider data consumption budget, such as a data consumption budget for background state, whether per app or for the user device as a whole.

In some embodiments, when deciding whether to preload or not, the OS considers the resources required by an app to preload. Such resources may comprise, for example, power drain, cellular data, memory, CPU, GPU and the like. In some embodiments, the OS learns this information over time, by measuring the resources consumed during preload. In some embodiments, the app at least partially declares (e.g., through an API) its requirements for at least part of such user device resources.

User Opt-Out/Opt-In

In some embodiments, OS 48 provides the user a UI option to opt-out of preload, and/or to opt-in to preload. In some embodiments the opting-in/out relates only to AppPreload functionality (i.e., the OS will not trigger app preloading for a user who has opted-out of AppPreload, and vice versa). In some embodiments the opting-in/out relates only to InAppPreload (i.e., to preloading of in-app Activities). In some embodiments the opting-in/out relates both to AppPreload and InAppPreload functionality.

In some embodiments the opting-in/out is given as an option in a certain settings menu. The option may be explicit, e.g., the user can explicitly choose whether or not the OS should trigger the relevant preload functionality set. In other embodiments the opting-in/out is implicit, e.g., using a UI option that does not directly relate to preload. For example, forced stopping of an app (e.g., through the settings menu in Android, or by swiping-off an app from recents menu in iOS) will cause an implicit opt-out of preload, at least until the app is not in forced-stop state. As another example, setting the user device to a battery-saving state by the user (e.g., the Android Battery Saver state) will cause an implicit opt-out of preload, at least until the user device has exited from the battery-saving state.

App Opt-Out/Opt-In

In some embodiments, OS 48 provides the app an option, e.g., through an API, to opt-out of and/or opt-in to preload. In some embodiments the OS provides one API for opting-out and opting-in, both for AppPreload and InAppPreload. In other embodiments the OS supplies an API that allows the app to select which functionality to opt-out/opt-in of, either AppPreload, InAppPreload or both. When an app opt-outs of a preload functionality, the OS does not trigger that functionality until the app opts-in again.

User-Initiated Preload Triggering

In the embodiments described up to this point, preloading operations were typically triggered by OS 48, in response to various possible conditions and criteria. In alternative embodiments, OS 48 enables the user to request preloading explicitly. In some embodiments, OS 48 provides a UI that comprises an option for the user to explicitly request preloading of a specific app or a set of apps. Preload agent 50 preloads an app or a set of apps in response to an explicit request from the user, provided using this UI option.

In an embodiment, OS 48 presents the UI option to the user only for apps which support app preloading. In some embodiments, the option is given as part of the UI of the user device home screen (also known as "Launcher" in Android OS). In some embodiments, the UI option lets the user access extra launching options for a certain app by a certain UI method of the home screen, e.g., by pressing and holding an icon of the selected app, whereas the extra launching options comprise an explicit option for preloading the selected app.

When preloading explicitly due to a request by the user, agent 50 preloads the app in the background, e.g., using any of the preloading techniques described herein or using any other suitable preloading technique.

In some embodiments, preloading is completely transparent to the user. In other embodiments, although the app is preloaded in the background (without being displayed to the user), the preloading operation is permitted have some effect on the user experience, e.g., due to usage of user device resources such as the CPU and audio. In some embodiments, OS 48 does not play the audio of preloaded apps, to prevent interference for the user. These kinds of partial transparency or non-transparency may be acceptable by users as the app is being preloaded due to their explicit request.

In some embodiments, the app supports both preload which is explicitly requested by the user and preload which occurs not due to the user's request (e.g., triggered by the OS). In some embodiments, the app utilizes the same logic for both kinds of preload. In other embodiments the app uses different logic for user-initiated preload and for non-user-initiated (e.g., OS-initiated) preload.

In some embodiments, the app is not aware of preload that is explicitly requested by the user. This means the app runs the same logic when preloaded and when normally launched. Specifically, in these embodiments the app does not need to integrate specific Apia to support preloading. This functionality may be acceptable in case of a preload which is explicitly requested by the user, as opposed to preload which occurs not due to user's request, e.g., preload that the user is unaware of. For example, certain app actions, such as analytics which report that the user had launched the app, may be reasonable to be performed in case of a preload which is explicitly requested by the user, as opposed to the case of a preload which happens not due to user's request, where such actions may not be applicable.

Reporting Preload Status to User

In some embodiments, OS 48 presents to the user information that is indicative of the current progress status of preloading. Any suitable output can be used for this purpose. For example, OS 48 may present to the user a progress bar that gradually fills as preloading progresses. Such a progress bar may be displayed, for example, as part of the app's icon or elsewhere in the UI.

As another example, after preload of an app is completed, OS 48 indicates to the user that the app is ready to be used. This indication is referred to herein as "preloading completion." The OS may provide a preloading completion indication only for apps whose preloading was triggered by the user, only for apps whose preloading was triggered by the OS without explicit request of the user, or for both. In some embodiments, the preloading completion indication for apps whose preloading was triggered by the OS (without explicit request of the user) is different from the preloading completion indication provided for preloading of apps whose preloading was triggered explicitly by the user.

In some embodiments, the OS provides the preloading completion indication through a UI notification, e.g., in a window of the OS UI that normally displays notifications to the user. In some embodiments, the preloading completion indication is provided by suitably marking the app's icon on the launcher.

Transparent Reloading Of Applications that Produce Audio

Some user applications ("apps") 26 produce audio output when launched. When preloading such an app in the background, it is important that the preloaded app remain silent, and also that the preloaded app does not affect audio playback of other, non-preloaded apps. In some embodiments described below, preload agent 50 in OS 48 of user device 24 (FIG. 1) preloads an audible app 26 in a manner that meets the above requirements, thereby making the preloading process transparent (i.e., unnoticeable) to the user.

App-Controlled Audio Inhibition

In some embodiments, the preloaded app is aware that it being preloaded. For example, OS 48 may indicate to the app (typically per Activity) whether it is being preloaded or not, by using the isPreloaded( ) API, described above. In these embodiments, the app logic may inhibit the app audio by refraining from playing audio during preload. In an embodiment, the app refrains from playing audio that is not applicable to preload. In an embodiment, during preload the app does not play sounds that would not have been played had this preload not happened, but does play sounds that would have been played had this preload not happened. For example, a music player which plays music regardless of having preloaded activities, would still play music as requested by the user while having its activities preloaded.

OS-Controlled Audio Inhibition

In other embodiments, preload agent 50 in OS 48 inhibits the audio of a preloaded app. OS-controlled audio inhibition is useful, for example, for preloading apps that are not aware of preloading or as a safeguard against misbehaving apps.

In some embodiments, OS-controlled audio inhibition is accomplished by muting audio which is linked to specific processes (the term process, in the present context, pertains to conventional operating system terminology). In some embodiments, agent 50 mutes audio for specific processes by managing a list of processes to be muted (referred to herein as a "Muted Process List"), and ensuring that audio which is linked to the processes on the list is muted.

In some embodiments, OS 48 identifies processes by a unique Process Identification number (PID). In some embodiments, agent 50 implements the Muted Process List as a set of PIDs. In this implementation, the audio of a process is muted if (and only if) the PID of that process is on the Muted Process List.

In some embodiments, OS 48 identifies applications by a Unique ID (UID). In some embodiments, agent 50 implements the Muted Process List as a set of UII)s. In this implementation, an app's process audio is muted if (and only if) that app's UID appears on the Muted Process List.

In some embodiments, agent 50 implements the Muted Process List as a set of {PID, UID} pairs. In this implementation, an app's process audio is muted only if that app's UID and its process PID form a pair that is currently on the Muted Process List.

In some embodiments, muting an app or an app's process is performed by lowering the volume of audio linked to that app or app's process to zero, or to a sufficiently small non-zero value that would still not be noticeable to the user.

In some embodiments, an app can opt-out of muting, e.g., via a specific API provided to the app, e.g., via an SDK integrated into the app.

In some embodiments, agent 50 mutes a preloaded app while the app is in the preload state (e.g., in foreground simulation state 110 or in preloaded background state 114, seen in FIG. 5B above). Agent 50 removes the muting condition when the app exits the preload state.

In other embodiments, agent 50 mutes the app audio only while the app is in simulated foreground state 110, and does not mute the app audio while the app is in preloaded background state 114.

In some embodiments, agent 50 mutes the app audio only if the app is not already playing audio. In other embodiments, agent 50 refrains from preloading an app that is already playing audio.

Audio Inhibition Using Existing OS Components
(e.g., Incoming Call or Audio Focus Mechanisms)

In some embodiments, OS 48 comprises an OS component that is configured to coordinate audio output among the various apps running in user device 24. Preload agent 50 may invoke, or otherwise use, such an OS component for inhibiting the audio of a preloaded app.

One example of such an OS component is the OS software code that mutes the audio of user applications in response to reception of an incoming phone call, and begins playing a ringing audio track. By invoking this software code, agent 50 can force muting of apps 26.

Another example of an OS component, which coordinates audio output among apps, is the OS software code that grants "audio focus" to requesting user applications. In the Android OS, for example, when an app needs to output audio, it should request audio focus. The OS may grant or reject the request. When the app has audio focus, it can play sounds. However, after acquiring audio focus, the app may not be able to keep it until it is done playing. Another app can request audio focus, which pre-empts the first app's hold on the audio focus. In such a case, the former app should pause playing or lower its volume to let the user hear the new audio source more easily. The audio focus mechanism is not necessarily binding to the apps, and/or may not be strictly enforced. For example, apps may be encouraged to comply with the audio focus guidelines, but the OS may not necessarily enforce the rules. If an app decides to continue playing loudly even after losing audio focus in such cases, it is not always prevented from doing so.

In some embodiments of the present invention, agent 50 uses the audio focus OS component for coordinating preload, e.g., for preloading an app transparently to the user.

In an example embodiment, the preloaded app is aware that it is being preloaded, e.g., using the above-described isPreloaded( ) API. In these embodiments, the app logic may inhibit its own audio by refraining from requesting audio focus during preload.

In another embodiment, OS 48 does not grant audio focus to an app that is in a preload state (e.g., in foreground simulation state 110 or in preloaded background state 114, as seen in FIG. 5B above). In another embodiment, OS 48 does not grant audio focus to a preloaded app while the app is in simulated foreground state 110, but does grant audio focus to the app while in preloaded background state 114.

In some embodiments OS 48 grants 'Dummy Audio Focus' to a preloaded app. Granting Dummy Audio Focus means that from the app's perspective, the app receives a grant response to the audio focus request it had submitted, but from the perspective of other apps, nothing has happened. In particular, if another app had the audio focus, the audio focus would not be taken from it. The "Dummy Audio Focus" mechanism serves the following purposes:

The app being preloaded is provided with a simulated environment similar to regular loading. Such an environment may be needed by some apps in order to fully load. If the preloaded app is muted, such as using methods described in the previous section, the user will not hear its audio in any case.

Other apps, which may play audio while the preloaded app is being preloaded, will not be notified that audio focus has been taken away from them. As a result, these apps will not silence or lower their volume. This feature ensures that the audio the user is currently listening to will not be interrupted.

In some embodiments, when OS 48 rejects an audio focus request from a preloaded app, or grants a dummy audio focus, the OS keeps a 'debt' mark for that preloaded app. When the user enters the preloaded app, the OS issues a simulated audio focus request on behalf of the app, in order to compensate for the previously rejected or dummy-granted request. In some embodiments, the OS performs this compensation only if the user entered the preloaded app during simulated foreground (state 110 of FIG. 5B). In other embodiments, the OS performs the compensation (issues the simulated audio focus request) regardless of whether the preloaded app is in the foreground simulation state (state 110) or has already been transitioned into the preloaded background state (state 114).

In some embodiments, OS 48 mutes the audio of a preloaded app only if the app does not already have audio focus, given prior to preload (i.e., only if the app is not the last app that has been granted audio focus).

In some embodiments, OS 48 maintains a stack that is referred to as an "audio focus request stack". An app will be in the audio focus request stack if (and only if) it has requested audio focus and has not abandoned the request since (either explicitly via a specific OS API or implicitly by being terminated). In some embodiments, OS 48 mutes a preloaded app only if the app is not in the audio focus request stack. In other embodiments, the OS refrains from preloading an app which currently has the audio focus. In other embodiments, the OS refrains from preloading an app if the app is in the audio focus request stack.

Figure 6:
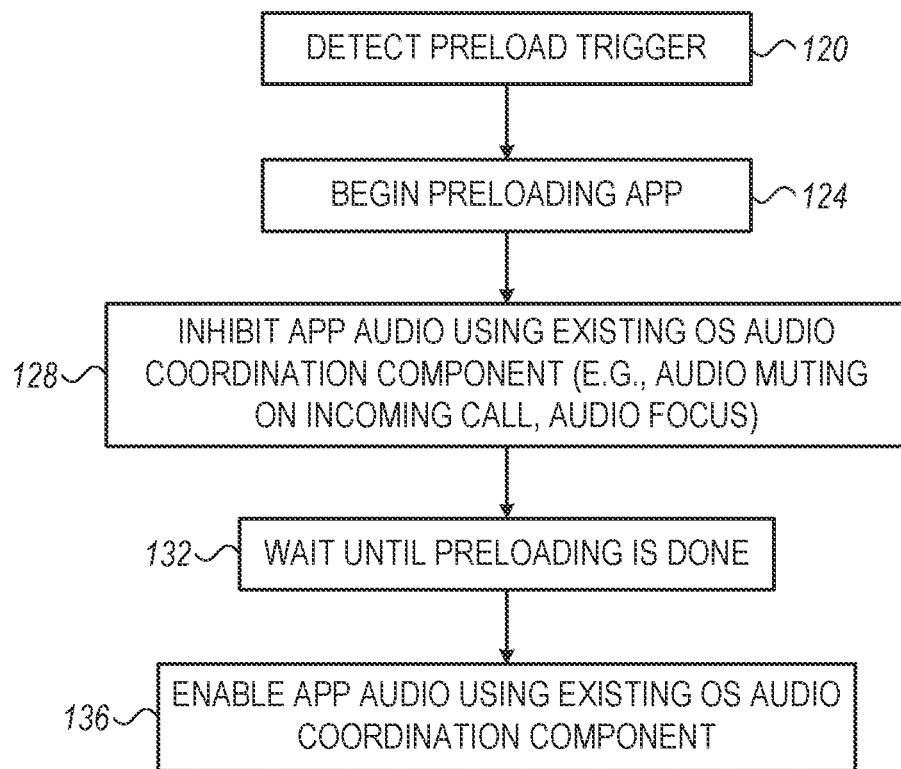
FIG. 6 is a flow chart that schematically illustrates a method for inhibiting audio of a preloaded application, in accordance with an embodiment of the present invention.

FIG. 6 is a flow chart that schematically illustrates a method for inhibiting audio of a preloaded application, in accordance with an embodiment of the present invention. The method begins with preload agent 50 detecting a preload trigger, at a trigger detection step 120. The preload trigger may comprise any suitable event that causes OS 48 to decide to preload an app 26 (as noted above, the term "preloading an app" refers to preloading any app components, e.g., one or more activities, and/or in-app content).

In response to the preload trigger, preload agent 50 begins preloading the app, at a preloading step 124. At an audio inhibition step 128, agent 50 inhibits the audio of the app being preloaded using a component of OS 48 that is designated to coordinate audio output among apps 26. The OS component, as explained above, may comprise, for example, software code that mutes app audio upon receiving an incoming call, or a software code that grants audio focus to apps.

At a completion checking step 132, agent 50 waits until the preloading operation is completed. Once preloading is completed, agent 50 enables the app audio using the OS component, at an audio enabling step 136.

Audio/Video Usage, and User Interaction with Notifications/Widgets, as Indications that Loading is Completed During Preload As described above (e.g., with respect to FIG. 5B), in some embodiments the preload process begins in a foreground simulation state (state 110 in FIG. 5B) in which agent 50 loads the appropriate UI displays. Once loading is completed (according to various possible criteria that have been described above), agent 50 transitions the app to a preloaded background state (state 114 in FIG. 5B).

In some embodiments, while a preloaded app is in the foreground simulation state, agent 50 detects that the app begins, or is about to begin, outputting media (audio or video) to the output device (e.g., audio output device 58 or screen 56), and uses this detection as an indication that loading is completed. In an embodiment, agent 50 uses this indication as a trigger to transition the app from the foreground simulation state to the preloaded background state.

The media being detected in these embodiments is typically start-up video or audio of the app, or other media that is played over time. The disclosed technique ensures that such media will not begin playing until the user has requested starting the app (e.g., click on the app icon).

In some embodiments, agent 50 detects that an app is about to begin outputting audio, by detecting that the app has requested audio focus. The same detection criterion is also useful for detecting that an app is about to start playing video, because an app that is about to start generating video will also typically request audio focus.

Another possible indication that loading is completed (for a preloaded app undergoing foreground simulation) is that the user begins interacting with a notification or widget associated with the app. Notifications and widgets are examples of visible "out-of-app" UI elements that an app may show, other than the app's views, screens, or Activities (as defined by the Android OS) that normally show when the user clicks on the app's icon.

Further alternatively, any other suitable detection mechanism can be used. For example, another possible indication is that the app attempts to access or use a Limited Hardware Resource (LHR) such as a camera (see details further below).

Figure 7:
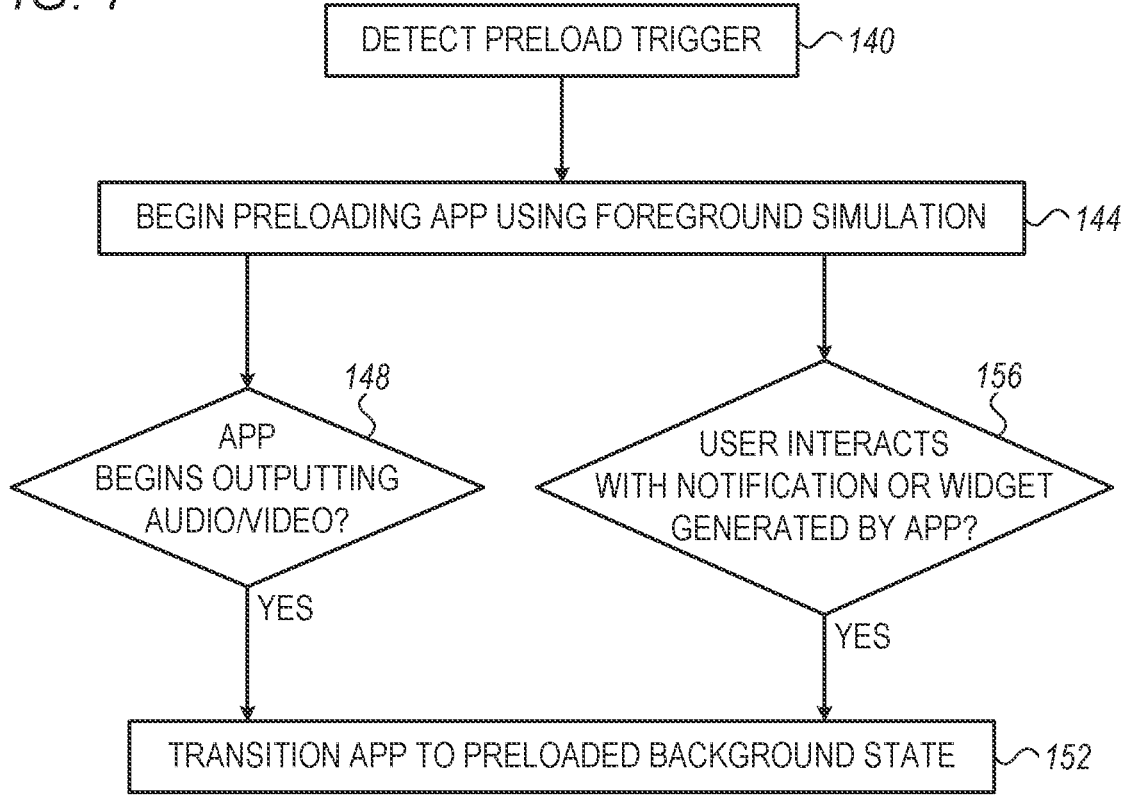
FIG. 7 is a flow chart that schematically illustrates a method for detecting completion of loading during application preload, in accordance with an embodiment of the present invention.

FIG. 7 is a flow chart that schematically illustrates a method for detecting completion of loading during preloading, in accordance with an embodiment of the present invention. The method begins with preload agent 50 detecting a preload trigger, at a trigger detection step 140. In response to the trigger, agent 50 begins loading the appropriate UI displays using foreground simulation, at a foreground simulation step 144.

At an Output checking step 148, agent 50 checks whether the app begins, or is about to begin, outputting audio or video. Once this condition is met, agent 50 transitions the app to the preloaded background state, at a transitioning step 152. In addition, at an interaction checking step 156, agent 50 checks whether the user interacts with an "out-of-app" UI element such as a notification or widget. If so, agent 50 transitions the app to the preloaded background state, at transitioning step 152.

Preloading of Apps that Access Limited Hardware Resources

Another aspect of preloading an app transparently to the user, has to do with ensuring that the app does not hold hardware resources that may be needed by apps that the user is aware of. Such a hardware resource that, if held by a preloaded app, might degrade the user experience in interacting with another app, is referred to as a Limited Hardware Resource (LHR), One example of an LHR is a camera of the user device.

In some embodiments, agent 50 prevents access of a preloaded app to LHRs. Limiting access of preloaded apps to LHRs, such as cameras, is desirable for several reasons:
- A preloaded app that uses an LHR during preload may prevent foreground apps from accessing this hardware resource.
- A preloaded app, which attempts to access an LHR during preload, may fail in accessing the LHR if another app is already using the LHR, or if another app begins using the LHR during preload.
- LHRs may be relatively expensive to operate, e.g., in terms of power consumption.

In an example embodiment, the preloaded app is aware that it is being preloaded, e.g., using the above-described isPreloaded( ) API. In these embodiments, the app logic may refrain from accessing LHRs during preload.

In some OSs, before an app can use an LHR, such as a camera device, the app needs to request access from the OS. In some embodiments, OS 48 will reject an app's request for using an LHR if the app is in a preload state. In other embodiments, the OS will reject an app's request for using an LHR if the app is in the foreground simulation state, but allow the request if the app is in the preloaded background state.

In some embodiments, when a preloaded app in the foreground simulation state attempts to access or use an LHR, such as a camera, agent 50 detects the attempt and uses it as an indication that loading is completed. In some embodiments, agent 50 will thus transition the app to the preloaded background state.

Figure 8:
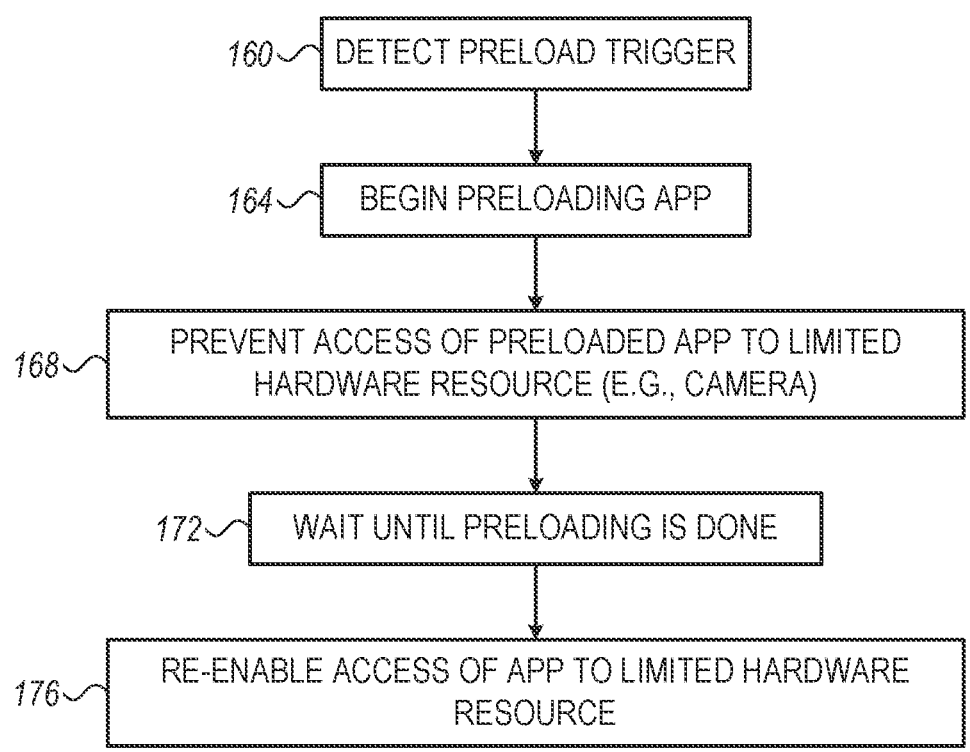
FIG. 8 is a flow chart that schematically illustrates a method for preventing access of a preloaded application to a Limited Hardware Resource (LHR), in accordance with an embodiment of the present invention.

FIG. 8 is a flow chart that schematically illustrates a method for preventing access of a preloaded application to a Limited Hardware Resource (LHR), in accordance with an embodiment of the present invention. The method begins with preload agent 50 detecting a preload trigger, at a trigger detection step 160. In response to the preload trigger, preload agent 50 begins preloading the app, at a preloading step 164.

At an access prevention step 168, agent 50 blocks access of the preloaded app to LHRs. At a completion checking step 172, agent 50 waits until the preloading operation is completed. Once preloading is completed, agent 50 re-enables access of the app to the LHRs, at an access enabling step 176.

Preload Strategy Per App or Category

In various embodiments, any of the techniques described above may be combined into specific preload strategies which affect audio inhibition, audio focus management, video playback, and the overall preloading procedure. Certain combinations of the disclosed techniques may fit certain specific apps and/or specific app categories, whereas other combinations may fit other apps and/or categories. Some OSs, such as the Android OS, maintain a category parameter per app, indicating the app's category.

In some embodiments, OS 48 uses an app's identifier (such as Android's package name) or category parameter to set a preload strategy which defines the selected audio-related preload methods. Examples of app categories and corresponding preload strategies may comprise the following:

"Games" category: Mute during preload state, grant dummy audio focus during Foreground Simulation, reject audio focus requests during Preload Background.

"Audio" and "Music players" categories: Do not mute at all, grant audio focus normally.

Other app categories: Mute only during foreground simulation, transition the app from foreground simulation to preloaded background if the app requests audio focus during foreground simulation.

In some embodiments, OS 48 uses an app's identifier (such as Android's package name) or category parameter to set a preload strategy which defines the selected video-related preload methods. Examples may include the following:

"Games" category: Allow video to be played during foreground simulation.

Non games: If the app starts playing a video, regard as an indication that loading is completed (e.g., transition the app from foreground simulation to preload background).

Maintaining User Transparency on Specific OS Aspects

The following section lists specific features of the Android OS, and the way in which preload agent 50 may treat these features during preloading to maintain transparency to the user. The list uses Android terminology, by way of example, but the features and actions may be applicable to preload implementation on other OSs. Each feature is given as a specific embodiment of preload implementation, where further specific embodiments may combine any or all of the specified features.

Activity/'balloon' message pop-ups: A preloaded app does not pop-up activities to the foreground without user action. A preloaded app does not install apps, or launch other apps, actions which may normally cause pop-ups.

Activity launching animations: Preload does not affect activity launching animations. For example, entering a preloaded app will be followed with the same animations that are normally followed when entering a normal app.

Activity states: Preloading does not affect the state of activities in other apps. The series of lifecycle events of user-activated apps remains the same. For example, preloading does not cause the foreground activity to Pause or Stop.

Alarms, Jobs, Services: A preloaded app during Simulated Foreground is allowed to run services/jobs/alarms as if it were in the foreground. A preloaded app in Preloaded Background is given the same rights to run services/jobs/alarms as if it were in the normal background. When moving from Simulated Foreground to Preloaded Background, the preloaded app receives a one-minute grace period during which it is allowed to run services, similarly to a regular app transitioning from foreground to background.

App entry: Preload does not affect the user's ability to launch apps. For example, the user may enter a preloaded app like any other app. The user simply clicks on the app as he/she normally does, e.g., from the launcher, from the app drawer or from the Recents screen (if the preloaded app is shown there). As another example, the user may launch a preloaded app at any stage, even if the app is currently in Simulated Foreground. If entering during Simulated Foreground and the loading has not completed, the app continues loading seamlessly in the foreground.

App standby: Preloading in Offline pre-render mode, as defined in PCT International Publication WO2021/019415, cited above, does not cause the app to exit App Standby state. Preloading in Online pre-render mode, as defined in PCI international Publication WO2021/019415, exits App Standby state for the preloaded app, if the app was in that state, to allow access to the network.

Background process running: The preloaded app remains in a live process, similarly to any other live app, but is run as low priority process to not affect the foreground apps.

Back Stack & Z-Ordering: Preloading does not interfere with the order of other apps and activities. For example, the user cannot get to a preloaded app by pressing the back button (unless that would have been the case without preload).

Forced Stopped State: Preloading respects the force stopped state of apps, and so does not preload a force stopped app or modify force-stopped state of any app.

Foreground app: Preload does not affect the foreground app. For example, preloading an app is avoided in case the app to be preloaded is in the foreground.

Live activities: Preload does not affect non-preloaded live activities. For example, preloading an app is avoided in case the app has live activities (activities resident in memory).

Network access: An app preloaded with the Offline Prerender Mode is blocked from network access during Simulated Foreground. An app preloaded with the Online Mode can access the network during Simulated Foreground like any app in the foreground. Regardless of the selected Preload Mode, preloaded apps in Preload Background are given the same access to the network as if they were in the normal background.

Notifications: A preloaded app is allowed to trigger notifications, similar to all non-force-stopped apps. An app which receives a trigger message for a notification during Simulated Foreground may query an API such as the isPreloaded( ) API, supplied e.g., via an SDK, in order to optionally change its normal foreground logic so that it would display the notification while being preloaded.

Split Screen (Multi window mode): Preload does not affect Android's Split Screen and is fully aligned with it. For example, the OS can preload apps while the user device is in split screen (and without forcing the device to exit the split screen) even for apps which do not support split screen. When entering a preloaded app, the app seamlessly adapts to the current device setting, whether it is split screen or regular, and to any split screen window size, and regardless of what the device setting was while the app was preloaded.

Recents Screen: Preloading does not affect the state of the Recents Screen. For example, if a preloaded app was not in the Recents Screen prior to being preloaded, it remains off the Recents Screen. As another example, if a preloaded app was in the Recents Screen prior to being preloaded, the entry remains there as it was, including the previously captured screenshot.

Screen Orientation: Preloading does not affect the state of screen orientation, even when preloading apps which require a different orientation than the current one. For example, if the user is using the device and screen orientation is portrait, preload is triggered for an app which requires landscape orientation, the outcome is that the app is preloaded in landscape orientation while the user continues to be in portrait orientation. The orientation will change only if and when the user enters the preloaded app.

Screen state: Preloading does not affect the state of the screen (on/off) and works across both screen states.

Sound: A preloaded app during Simulated Foreground does not produce sound (is not audible) and does not interfere with audio playback of other apps. A preloaded app in Preload Background is capable of producing sound similarly to any other background app. Note that apps typically stop their audio when they are moved from foreground to background, and the same is performed when a preloaded app moves from Simulated Foreground to Preload Background.

Task state: Preload keeps the existing task structure intact. When preloading an app with an existing task, preload revives the top activity and passes the saved instance state to the app, as normally would happen in case user enters an app with an existing task, whose process was killed by the OS.

Vibration: A preloaded app does not produce any vibrations.

Window Focus: A preloaded app does not take window focus from the foreground.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A user device, comprising:
an output device; and
one or more processors, configured to:
    before a user of the user device requests to interact with a user application, preload one or more User Interface (UI) displays of the user application in a simulated-foreground mode in which the UI displays are (i) processed in a foreground mode from the perspective of the user application, but (ii) kept in a background mode from the perspective of the user and hidden from the user; and
    in response to detecting that the user application begins, or is about to begin, outputting media to the output device, decide that preloading of the one or more UI displays is completed.

2. The user device according to claim 1, wherein, in response to deciding that preloading of the one or more UI displays is completed, the one or more processors are configured to transition the user application to a preloaded-background state in which both the user and the user application consider the UI displays to be in the background.

3. The user device according to claim 1, wherein the media comprises audio.

4. The user device according to claim 1, wherein the media comprises video.

5. The user device according to claim 2, wherein, by transitioning the user application to the preloaded-background state, the one or more processors are configured to ensure that the media begins to play only after the user requests interaction with the user application.

6. The user device according to claim 3, wherein the one or more processors are configured to detect that the user application is about to begin outputting audio, by detecting that the user application has requested audio focus from an Operating System (OS) of the user device.

7. A user device, comprising:
a Limited Hardware Resource (LHR) that is shared among user applications running in the user device; and
one or more processors, configured to:
    preload a user application; and
    in response to detecting that the preloaded user application begins accessing the LHR, decide that preloading of the user application is completed.

8. The user device according to claim 7, wherein the LHR comprises a camera of the user device.

9. The user device according to claim 7, wherein the preloaded user application is configured to be aware of the preload state, and to refrain from accessing the LHR while in the preload state.

10. A method, comprising:
in a user device having an output device, preloading Interface (UI) displays of a user one or more User application before a user of the user device requests to interact with a user application, wherein preloading is performed in a simulated-foreground mode in which the UI displays are (i) processed in a foreground mode from the perspective of the user application, but (ii) kept in a background mode from the perspective of the user and hidden from the user; and
in response to detecting that the user application begins, or is about to begin, outputting media to the output device, deciding that preloading of the one or more UI displays is completed.

11. The method according to claim 10, and comprising, in response to deciding that preloading of the one or more UI displays is completed, transitioning the user application to a preloaded-background state in which both the user and the user application consider the UI displays to be in the background.

12. The method according to claim 10, wherein the media comprises audio.

13. The method according to claim 10, wherein the media comprises video.

14. The method according to claim 11, wherein transitioning the user application to the preloaded-background state comprises ensuring that the media begins to play only after the user requests interaction with the user application.

15. The method according to claim 12, wherein detecting that the user application is about to begin outputting audio comprises detecting that the user application has requested audio focus from an Operating System (OS) of the user device.

16. A method, comprising:
preloading a user application in a user device having a Limited Hardware Resource (LHR) that is shared among user applications running in the user device; and
in response to detecting that the preloaded user application begins accessing the LHR, deciding that preloading of the user application is completed.

17. The method according to claim 16, wherein the LHR comprises a camera of the user device.

18. The method according to claim 16, wherein the preloaded user application is configured to be aware of the preload state, and wherein preventing the preloaded user application from accessing the LHR comprises refraining from accessing the LHR by the preloaded user application while in the preload state.

* * * * *